United States Patent
Cunningham

(10) Patent No.: US 7,191,090 B1
(45) Date of Patent: Mar. 13, 2007

(54) METHODS AND SYSTEMS FOR ACOUSTICALLY LOCATING COMPUTER SYSTEMS

(75) Inventor: Helen A. Cunningham, Los Altos Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/807,361

(22) Filed: Mar. 22, 2004

(51) Int. Cl.
*G01C 9/00* (2006.01)
*G01B 5/28* (2006.01)
*G06F 11/00* (2006.01)

(52) U.S. Cl. .................. 702/150; 702/35; 702/39; 714/30; 714/48

(58) Field of Classification Search .................. 702/33, 702/34, 35, 36, 39, 150; 714/30, 42, 47, 714/48
See application file for complete search history.

(56) References Cited

U.S. PATENT DOCUMENTS

| | | | |
|---|---|---|---|
| 5,974,862 A | * 11/1999 | Lander et al. | ............ 73/40.5 A |
| 2004/0205403 A1 | * 10/2004 | Markow et al. | ............... 714/30 |
| 2005/0058021 A1 | * 3/2005 | Feintuch et al. | .............. 367/99 |

\* cited by examiner

*Primary Examiner*—Bryan Bui
*Assistant Examiner*—Meagan S Walling
(74) *Attorney, Agent, or Firm*—Martine Penilla & Gencarella, LLP

(57) ABSTRACT

A method for determining a physical location of a source is provided. The method includes receiving an acoustic signal from a source placed within an acoustic monitoring area. The method also includes processing a received acoustic signal. The processing is configured to use data from at least two sensors. Also included is identifying an approximate localized point in the acoustic monitoring area. The approximate localized point defines a physical location of the source. The method further includes reporting the physical location of the source over a network.

23 Claims, 22 Drawing Sheets

METHODS AND SYSTEMS FOR ACOUSTICALLY LOCATING COMPUTER SYSTEMS

BACKGROUND

1. Field of the Invention

This invention relates generally to computer systems, and more particularly to systems and methods for ascertaining a location of a particular computer system in physical space.

2. Description of the Related Art

With the advancement of technology, today, a network of computer systems can be located in multiple computer data centers spanning a large geographical area. As a result, the health and status of such network of computer systems can be managed and monitored remotely by a system administrator using, for example, a desktop console. Thus, when each computer system can be defined in a different locale, system administrators may be merely aware of the respective logical addresses of each computer system within the hierarchy of hardware components.

Remotely managing a network of computer systems using the logical addresses of the computer systems may have several drawbacks. For instance, currently, computer system failures in a network of computer systems are communicated to the system administrator using network connections. However, because network communications can go down, communicating system failures via the network can be ineffective as the communicated data can be compromised or lost. Depending on the situation, the system administrator may eventually receive a failure notice when the network is up and running. However, by the time the failure notice is received by the system administrator, the system may have been down for an extended period of time, which can result in serious and irreparable damage.

Another limitation currently faced in maintaining the health of the network of computer systems is system administrator's inability to determine the location of a failed system in the physical space. Without knowing the locale of each system, repairing or replacing any of the failed systems can be an impossible task.

Yet another problem faced in managing a network of computer systems is that maintaining an inventory of systems and associated locations can be complex and time-consuming, and for such reason is sometimes not done. Currently, this limitation can be overcome by assignment of bar codes to each of the computer systems and maintaining a data file of the computer systems using the bar codes. The data file may further include a physical map depicting the physical location of each computer system. Any conventional inventory or spatial map can become obsolete when systems get moved around in the data center. Maintaining a spatial map offers no benefit unless the data file or the map is maintained up to date. Unless the data file or the map is updated, the service person is directed to the initial locale of the relocated computer systems upon receipt of a failure notice. As a result, the system administrator as well as the service person in charge of repairing or replacing the computer system will not be aware of the relocation of the system until the service person is actually in the initial locale of the system. In addition to unnecessarily wasting time and human effort, this method of maintaining the map and data file updated can also result in irreparable damage.

One approach to locating objects spanning a wide geographical area is to use radio frequency tags (RFID tags) characterized as an out-of-band localizing method. But, RFID tags cannot be implemented to locate computer systems in the physical space for several reasons. First, RFID data signals can be corrupted by the significant amounts of electromagnetic energy generated in the data centers. Second, implementing radio frequency signals requires using of multiple receivers in different physical locations, unnecessarily increasing costs.

Another approach to locating objects spanning a wide geographical area is to use in-band localizing method wherein data and location information is communicated and stored through the main signaling network. A shortcoming associated with the in-band localizing method is that reliance is placed on the existing network connections. This method also suffers from the drawbacks associated with a break in the network communications, which may result in serious and irreparable damage.

Yet another method to locate objects spanning a wide geographical area is to affix light or other visual objects to servers. This method is also unsatisfactory as only local humans can observe such visual signals. Additionally, the latter method does not allow the creation of a database including the location of the servers or communicating such information to any other electronic device.

Still another solution is to use Global Positioning System (GPS) to locate objects spanning a wide geographical area. This method, however, is unsatisfactory because GPS does not provide the spatial resolution needed to locate objects defined in close proximity as the objects are defined in the data centers. Additionally, GPS cannot provide reliable data regarding objects defined indoors (e.g., within metal building structure).

In view of the foregoing, a need therefore exists in the art for a method and system capable of locating each computer system of a network of computer systems in physical space while minimizing network dependency.

SUMMARY

Broadly speaking, the present invention fills this need by providing a method and a system for locating a computer system connected to a network of computer systems in a physical space using out-of-band communication. In one embodiment, a localizing acoustic system is implemented to locate the computer system connected to the network of computer systems in the physical space using streams of acoustic signals. It should be appreciated that the present invention can be implemented in numerous ways, including as a process, an apparatus, a system, a device, or a method. Several inventive embodiments of the present invention are described below.

In one embodiment, a method for determining a physical location of a source is provided. The method includes receiving an acoustic signal from a source placed within an acoustic monitoring area. The method also includes processing a received acoustic signal. The processing is configured to use data from at least two sensors. Also included is identifying an approximate localized point in the acoustic monitoring area. The approximate localized point defines a physical location of the source. The method further includes reporting the physical location of the source over a network.

In another embodiment, a localizing system for determining a physical location of a source in an acoustic environment is provided. The localizing system includes a transmitter device, at least a pair of compact sensors, and a signal processor. The transmitter device is defined on the source and is used for transmitting streams of acoustic signals. The pair of compact sensors is used for detecting and capturing the streams of acoustic signals. The signal processor is used for receiving and processing captured streams of acoustic signals so as to ascertain the physical location of the source.

In yet another embodiment, a method for ascertaining a physical location of a failed computer system in a data center is provided. The method includes receiving a failure report from the failed computer system and transmitting streams of acoustic signals. Also included is capturing transmitted streams of acoustic signals. The method further includes processing the transmitted streams of acoustic signals so as to determine the physical location of the failed computer system.

In still another embodiment, a method for generating a sonic map of a data center is provided. The method includes defining an acoustic signal processor on a central location of the system site for each system site in the data center. For each rack in the system site, the method further includes placing an acoustic signal emitter on a rack. For each computer system in the rack, the method includes generating an identifiable signal and communicating the identifiable signal to the rack. The method also includes transmitting associated streams of acoustic signals and capturing transmitted streams of acoustic signals by the acoustic signal processor. The method further includes processing transmitted streams of acoustic signals and displaying a locality of the computer system generating the identifiable signals.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 2A-2 is a simplified block diagram showing the signal processor dispatching the processed streams of acoustic signals to a dedicated personal computer for display, in accordance with another embodiment of the invention.

FIG. 2A-3 is a simplified block diagram depicting the output of the signal processor being provided to an undedicated processing computer system, in accordance with another embodiment of the invention.

DETAILED DESCRIPTION

Figure 1A:
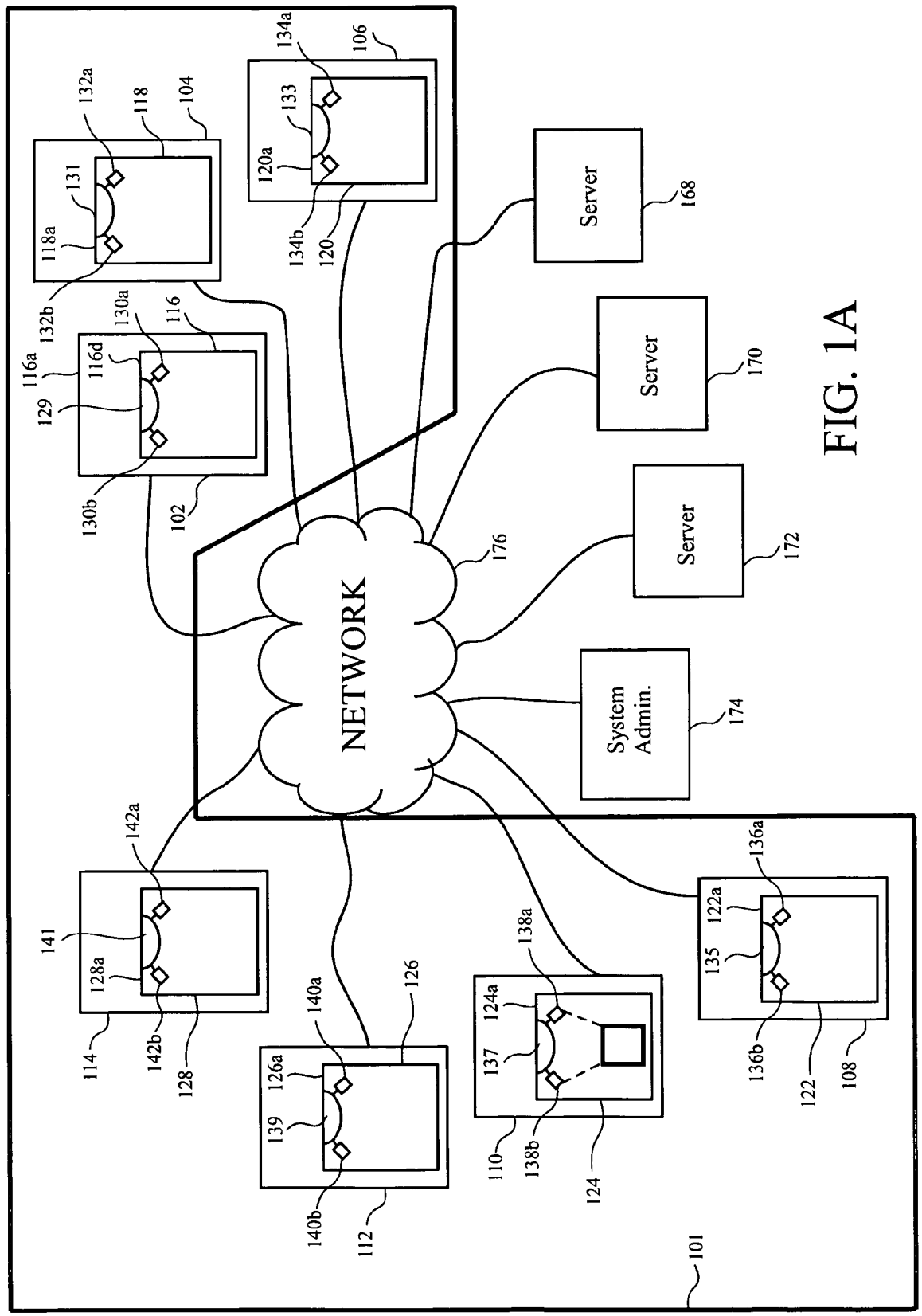
FIG. 1A is a simplified block diagram illustrating an exemplary acoustic localizing system of the present invention being used to determine a location of a computer system in a data center, in accordance with one embodiment of the present invention.

Inventions for ascertaining a physical locale of a computer system using out-of-band communications are provided. Several exemplary embodiments of the invention will now be described in detail with reference to the accompanying drawings.

The following embodiments provide methods and systems for locating a specific computer system of a plurality of computer systems connected via a network in the physical space using out-of-band communications. As used herein "out-of-band communication" refers to enabling communication between the plurality of computer systems of the network of computer systems with minimal reliance on the existing network connections. As used herein an "acoustic environment" can be defined as any contained physical space across or within which acoustic signals can travel freely (i.e., unobstructed by walls or other occlusive objects). In one example, an acoustic localizing system is implemented to locate a failed computer system in a data center spanning a wide geographical area. In one embodiment, the acoustic localizing system includes a signal transmitter device, an array of compact sensors, and a signal processor.

In one implementation, the signal transmitter device is defined on top of a rack including the failed computer system, and is configured to emit streams of acoustic signals upon becoming aware of a failure in the computer system. The streams of acoustic signals are then captured by the array of compact sensors defined on the surface of the signal processor. The signal processor is defined in a central location (e.g., a ceiling, etc.) of a structure in the data center, including the rack containing the failed computer system. Upon capturing the streams of acoustic signals, the captured signals are sent to the signal processor for processing. In one embodiment, arrival-time correlation method is implemented to pinpoint the physical locale of the rack, and thus the failed computer system. As used herein, arrival-time correlation method refers to numerical correlation of waveforms arriving at multiple sensors. More specifically, a correlation based on various time-shifted replicas of the waveforms is continuously computed. The true arrival time asynchrony of the various waveforms is represented by the time shift rendering the best correlation. Other exemplary methods that can be implemented to determine the physical locale of the racks are distributed sensor/time of flight and echolocation methods. In one example, a computer software is implemented to display the location/direction of the failed computer system on a display. As desired, the location of the failed computer system can be dispatched to any console for display (e.g., light beacons, wireless phones, etc.). In this manner, the location of the failed computer system is ascertained without relying on the network connections. In a different embodiment, the acoustic localizing system of the present invention can be implemented to create a spatial map of a data center. In another embodiment, the acoustic localizing system can be used by a user to perform a calibration "run" so as to ensure the accuracy of the acoustic localizing system.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Reference is made to a simplified block diagram of FIG. 1A depicting the use of an exemplary acoustic localizing system to determine a location of a computer system in a data center, in accordance with one embodiment of the present invention. As shown, a system administrator 174 manages and maintains a plurality of computer systems in a data center 101. In this embodiment, the data center 101 includes a plurality of structures 102–114 each of which may include a plurality of computer systems. For ease of reference, in FIGS. 1A–1B, the plurality of computer systems is defined in system sites 116–128 of respective structures 102–114. The plurality of computer systems defined in each system site 116–128 is shown to be in communication with a plurality of servers via a network 176. As will be explained in more detail with respect to FIGS. 2A-1 through 5, the plurality of computer systems can be arranged in any layout and configuration, depending on the data center 101.

As can be seen, each system site 116–128 further includes a respective signal processor 129–141, each of which is mounted on corresponding ceilings 116a–128a of the system sites 116–128, respectively. In one embodiment, the signal processors 129–141 are centrally located on the respective ceilings 116a–128a. Of course, the signal processors 129–141 may be defined in any central location in the data center.

Each signal processor 129–141 includes a respective array of compact sensors 130a and 130b through 142a and 142b. In the example shown in FIG. 1A, each compact sensor 130a and 130b through 142a and 142b is a microphone. However, in a different embodiment, compact sensors 130a and 130b through 142a and 142b can be any appropriate device capable of sensing streams of acoustic signals. In one example, the array of compact sensors can be in the form of a spherical or multi-hedral base having two or more pairs of microphones affixed thereon so that orthogonal sensing can be provided.

As will be explained in more detail below with respect to FIG. 2A-1 through 5, embodiments of the present invention have the capability to locate a computer system in a physical space by processing streams of acoustic signals emitted by the computer systems. By way of example, in the embodiment shown in FIG. 1A, the signal processor 137 is shown to have detected streams of acoustic signals emitted by one of the computer systems defined within the system site 124. As shown, using the array of compact sensors 138a and 138b, the signal processor 137 detects and localizes the emitted streams of acoustic signals. For instance, a plurality of computer systems may be defined in a plurality of racks arranged in a plurality of aisles. In accordance with one embodiment of the present invention, streams of acoustic signals may be emitted by a transmitter device affixed to the top of a rack, which in turn, can be detected by the array of compact sensors 138a and 138b. In this manner, the emitted streams of acoustic signals are processed by the signal processor 137, localizing the source of the streams of acoustic signals. Thus, the acoustic localizing system of the present invention uses a point of reference that is related to the system site as opposed to the logical address of the computer system within the network.

Figure 1B:
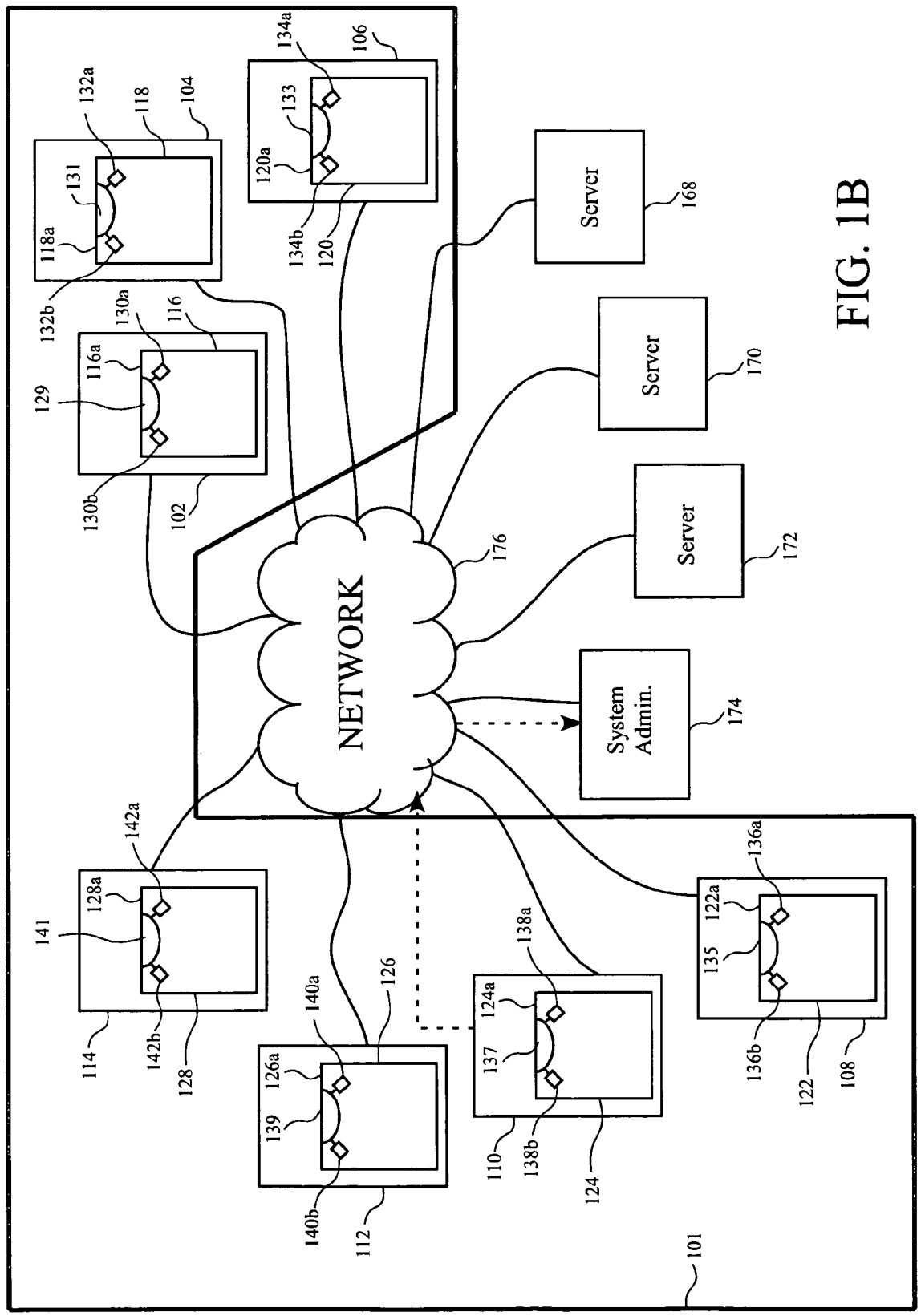
FIG. 1B is a simplified block diagram depicting communication of the locale of a failed computer system to the system administrator, in accordance with one embodiment of the present invention.

Continuing to a simplified block diagram shown in FIG. 1B, the location of the failed computer system as defined in system site 124 is communicated to the system administrator 174 via the network 176. In one embodiment, the signal processor 137 processes the stream of acoustic signals and subsequently dispatches the location of the computer system in the structure 110 to the system administrator 174 via the network 176. One of ordinary skill in the art must appreciate that the structures in the data center 101 can communicate with the system administrator 174 using any network appropriate for communicating data (e.g., Local Area Network (LAN), Internet, etc.), including wireless network.

At this point, the system administrator 174 can easily determine which structure among the plurality of structures forming the data center 101 houses the failed computer system as well as the rack, aisle, or quadrant of the data structure the failed computer system is defined. In this manner, the system administrator 174 can direct the service person responsible for maintaining, repairing, or replacing the failed computer system to a particular aisle, rack, or quadrant of the specific structure 110 that includes the failed computer system. Additional information with respect to the mechanism and structure of the acoustic localizing system of the present invention is provided below.

Figures 1, 2A:
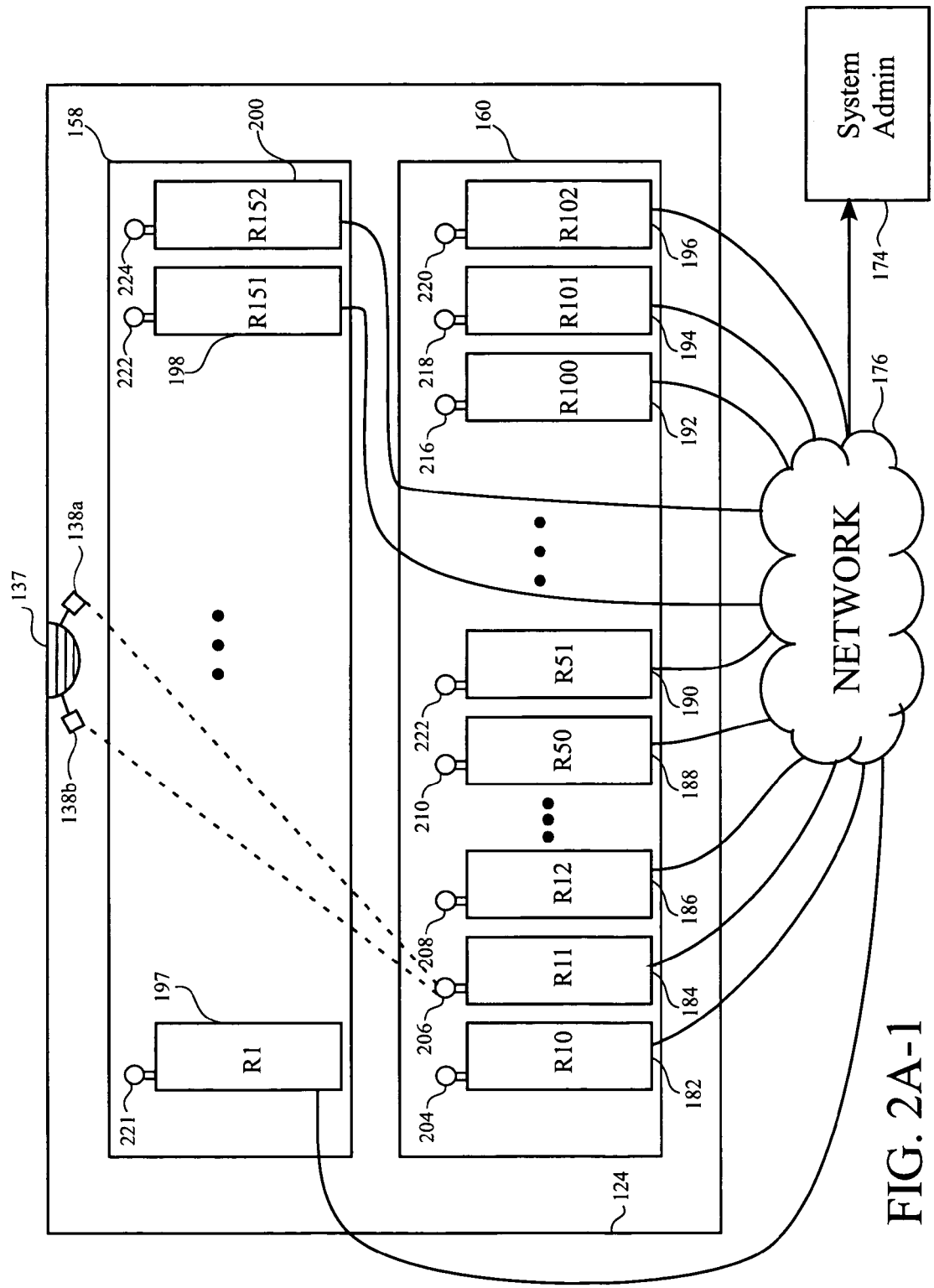
FIG. 2A-1 is a simplified block diagram illustrating the identification of a specific rack of a plurality of racks defined in a system site as the rack including the failed computer system by an exemplary acoustic localizing system, in accordance with another embodiment of the invention.

FIG. 2A-1 depicts a simplified block diagram illustrating the identification of a specific rack of a plurality of racks defined in the system site 124 by an exemplary acoustic localizing system, in accordance with one embodiment of the present invention. The illustrated system site 124 includes aisles 158 and 160 with racks 182 through 196 being defined in the aisle 160 and racks 197–200 being defined in the aisle 158. Of course, in a different embodiment, each system site can include any suitable number of aisles, each containing any appropriate number of racks.

As shown, the system administrator 174 can manage and monitor each of the computer systems defined in the system site 124 as each of the racks 182–200 is connected to the system administrator 174 via the network. As further shown, a plurality of acoustic emitter devices 204–224 is respectively defined on top of racks 182–200, respectively. In one embodiment, the acoustic emitter devices 204–224 are configured to be speakers. Of course, in a different embodiment, the acoustic emitter devices 204–224 can be any appropriate devices capable of emitting streams of acoustic signals (e.g., any artificial device driven by electrical current to emit sound, anything capable of making sounds (e.g., human voice, hand clap, clicker, tweeting bird, etc.), etc.).

Continuing with the embodiment shown in FIG. 2A-1, one of the computer systems in the rack 184 defined in aisle 160 has failed, as streams of acoustic signals are being transmitted by the acoustic transmitter device 206. The emitted streams of acoustic signals are picked up by the compact sensors 138*a* and 138*b* affixed to the signal processor 138. As will be explained in more detail with respect to FIGS. 3A–3C, in one embodiment, the array of compact sensors 138*a*–*b* and the signal processor 137 are configured to mimic the acoustic localization implemented by a human brain in response to sound observed by a pair of human ears. Specifically, the human brain computes the location of the sound being emitted using differences in time, phase, intensity, and timbre of emitted sounds as the emitted sounds arrive at the two ears. As such, in one embodiment, the array of compact sensors includes at least a pair of compact sensors, as shown by compact sensors 138*a*–*b*. In one embodiment, as will be explained in more detail below, mimicking acoustic localization by animals' and human ears is achieved by performing arrival-time correlation, which in one example, is performed by a computer software.

The streams of acoustic signals transmitted by the acoustic transmitter device 206 are picked up by the compact sensors 138*a* and 138*b*. At this point, the picked up streams of acoustic signals are dispatched to the signal processor 137. By way of example, the output of the array of compact sensors 138*a* and 138*b* may be converted from analog signals to digital signals. In accordance with one embodiment of the present invention, the signal processor 137 uses the arrival time as well as phase differences between the sensors 138*a* and 138*b* to determine the locale of the failed system. In one embodiment, the signal processor 137 can be an off-the-shelf digital signal processing card for personal computers. However, in a different embodiment, the signal processor 137 can be any appropriate software/hardware capable of processing the detected streams of acoustic signals.

As will be described in more detail below, certain sounds are constant in the system site 124 of the data center structure 110, and can be considered as background noise. The acoustic localizing system of the present invention can be designed to adapt to such background noise. For instance, over time, for any given environment, particular sounds and noise can be recognized by the system as background noise, and as such, be filtered out during the localizing process. Thus, the streams of acoustic signals can be configured to be conspicuous and distinctive so that the streams of acoustic signals can easily stand out from the background noise. For instance, the stream of acoustic signals can be a stream of chirps which are supersonic to human ears.

Figures 2, 2A:
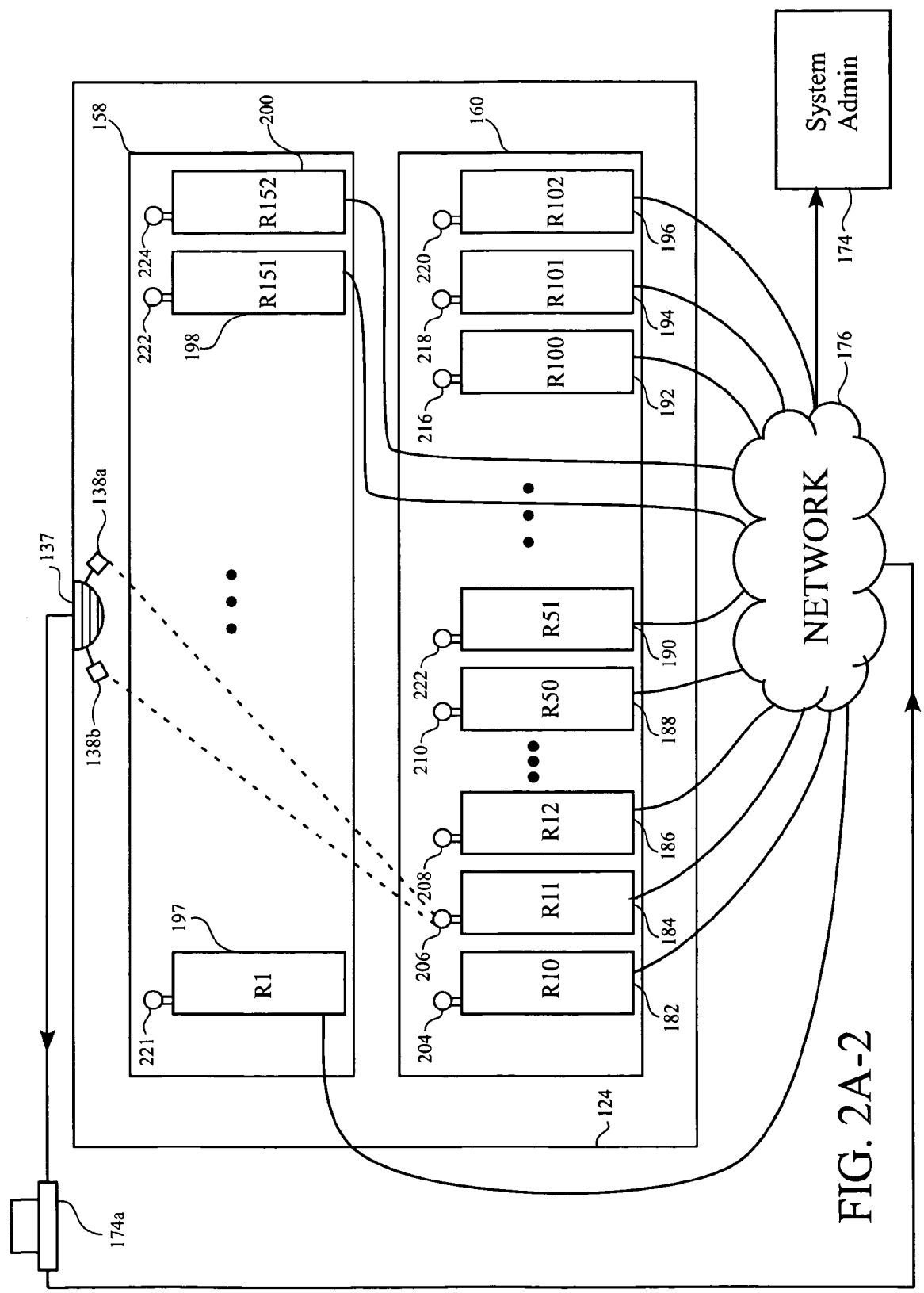

Proceeding to the simplified block diagram shown in FIG. 2A-2, dispatching the output of the signal processor 137 to a personal computer 174*a* for display and further processing by a computer software is depicted, according to one embodiment of the present invention. In one embodiment, the output of signal processor 137 is the standard Ethernet. However, in a different embodiment, the output of the signal processor 137 can be communicated to the computer system 174*a* using any appropriate communication protocol (e.g., Recommended Standard-232 (RS232), Universal Serial Bus (USB), infiniband, optic fiber, small computer system interface (SCSI), ABD, any wireless protocol (e.g., 802.11, Bluetooth, 9.2 Ghz (i.e., cell phone frequency), etc.), etc.). As can be seen, in the embodiment of FIG. 2A-2, the computer system 174*a* is a dedicated computer system designed to solely process the output of signal processor 137. However, in a different embodiment, the signal processor 137 can send the location of the failed computer system to a variety of destinations (e.g., handheld, desktop, or laptop computing devices, telephones or pagers, light-based beacons, etc.). As a consequence, whether the network is up or down will have no effect in locating the failed computer system.

As can be seen, in the embodiment of FIG. 2A-2, the output of the signal processor 137 is sent to the personal computer 174*a* that is defined within the structure 110 of the data center 101. In another example, however, the dedicated personal computer 174*a* can be defined on the ceiling of the system site 124 alongside the signal processor 138, in the system site 124 alongside the racks 182–200, etc.

In accordance with one embodiment of the present invention, the computer software running on the personal computer 174*a* processes the output of the signal processor 137 so as to determine the location of the failed computer system. The processed data can then be accessed by the system administrator 174 via the network 176. In this manner, the system administrator 174 can expeditiously locate the location of the rack including the failed computer system in the physical space. As a result, the location of the failed computer system can be easily determined causing the rearranging or displacing of a rack within the physical space to have almost no negative effect in locating the failed computer system.

Figures 2, 2A, 3:
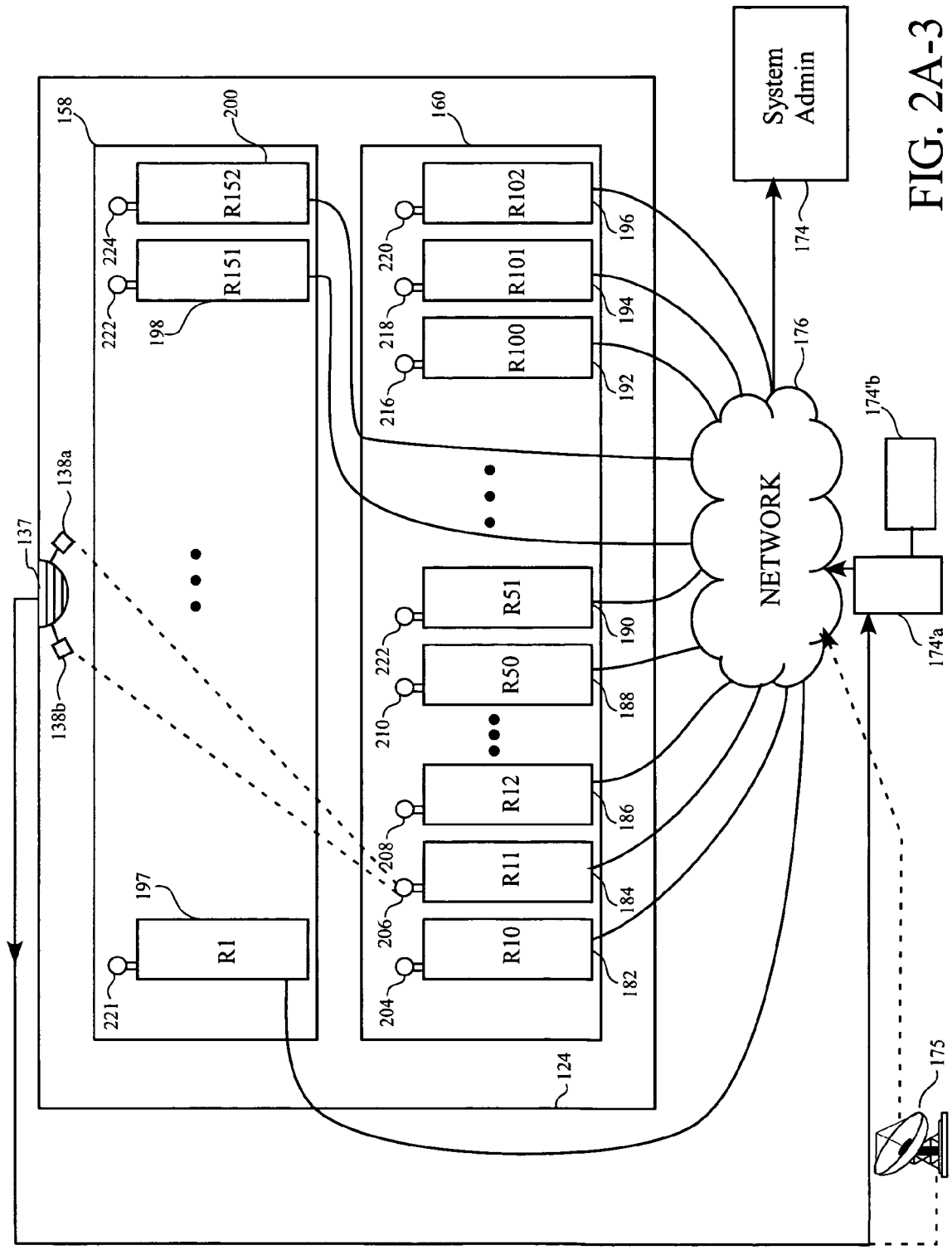

In a different embodiment, as shown in the simplified block diagram depicted in FIG. 2A-3, the output of the signal processor 137 is provided to the system administrator 174 via a processing computer system 174'*a* and the network 176. In this embodiment, the processing computer system 174'*a* can be an undedicated computer system designed to perform a plurality of various tasks. For instance, in one embodiment, the processing computer system 174'*a* can be an IBM mainframe, a Sun Microsystems, Inc. mainframe, an Intel machine, etc. configured to provide services to a plurality of personal computers. In such scenarios, the system administrator 174 can obtain the locale of the failed computer system by communicating to the processing computer system 174'*a* via the network. In one embodiment, locating the failed computer system using an undedicated processing computer system 174'*a* may delay ascertaining the locale of the failed computer system as the processing computer system 174'*a* can be used by several systems concurrently so as to perform several different jobs.

In accordance with another embodiment, when the network communications between the systems in the data center 101 are down, the output of the signal processor 137 can be provided to the system administrator 174 via a satellite 175 or other wireless method. In one example, the satellite 175 is Global Positioning System (GPS) designed to locate a physical location of the data center 101.

Figure 2B:
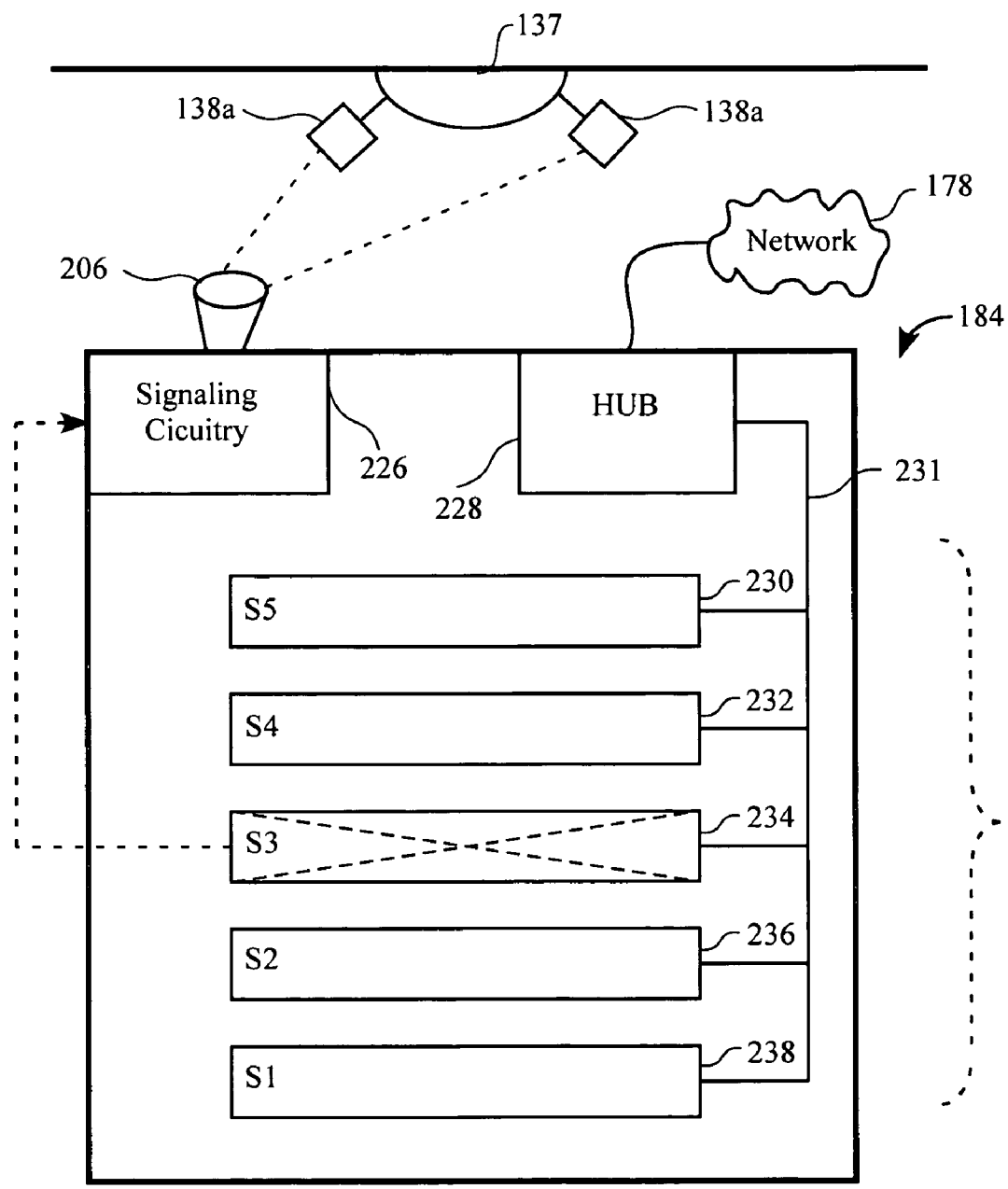
FIG. 2B is a simplified block diagram illustrating the acoustic localizing system of the present invention ascertaining the locale of a failed computer system in physical space using out-of-band communications, in accordance with another embodiment of the invention.

Reference is made to FIG. 2B illustrating the acoustic localizing system of the present invention being implemented to ascertain the locale of a failed computer system in physical space out-of-band, in accordance with one embodiment of the present invention. As shown, the rack 184 includes a plurality of computer systems 230–238 connected to a central connecting device 228 defined within the rack 184 via a bus 231. In the illustrated embodiment, the central connecting device 228 is a hub. As shown, the rack 184 is connected to the network 178 via the central connecting device 228. The central connecting device can be any appropriate device capable of providing connection between the computer systems defined within the rack 184 and the network 176. Thus, in the embodiment of FIG. 2B, the computer systems 230–238 defined within the rack communicate via the bus 231, i.e., in-band.

The illustrated rack 184 further includes a signaling circuitry 226. In one embodiment, a system failure in the computer system 234 is communicated with the signaling circuitry 226 out-of-band, which in one example, may be wireless. In this manner, a failure in communication between the computer systems 230–238 with the network 176 via the bus 231 will have almost no effect on locating a failed computer system in the rack, in accordance with one embodiment of the present invention. In one example, the acoustic transmitter device 206 may be defined on top of the rack 184 in a directional manner.

With continuing reference to FIG. 2B, once failure of the computer system 234 is communicated to the signaling circuitry 226 in-band, streams of acoustic signals are broadcasted by the acoustic transmitter device 206. At this point, the streams of acoustic signals are picked up by the array of compact sensors 138*a* and 138*b* followed by the processing streams of acoustic signals by the signal processor 137. Then, the output of the signal processor (i.e., the processed signals) is dispatched to the processing computer system running the computer software so as to determine the locale of the failed computer system 238 in the physical space, out-of-band.

In accordance with one embodiment, using a hierarchy of systems acting at different spatial scales, an end-to-end system can be provided to cover an entire geographical spectrum, from an individual computer component to a level of a geographical region. For instance, wireless signaling can be implemented to locate the identity of the failed computer system within a rack, acoustic signaling system can be implemented to locate the rack within the data center, and Global Positioning System can be implemented to locate buildings spanning a wide geographical area.

Figure 3A:
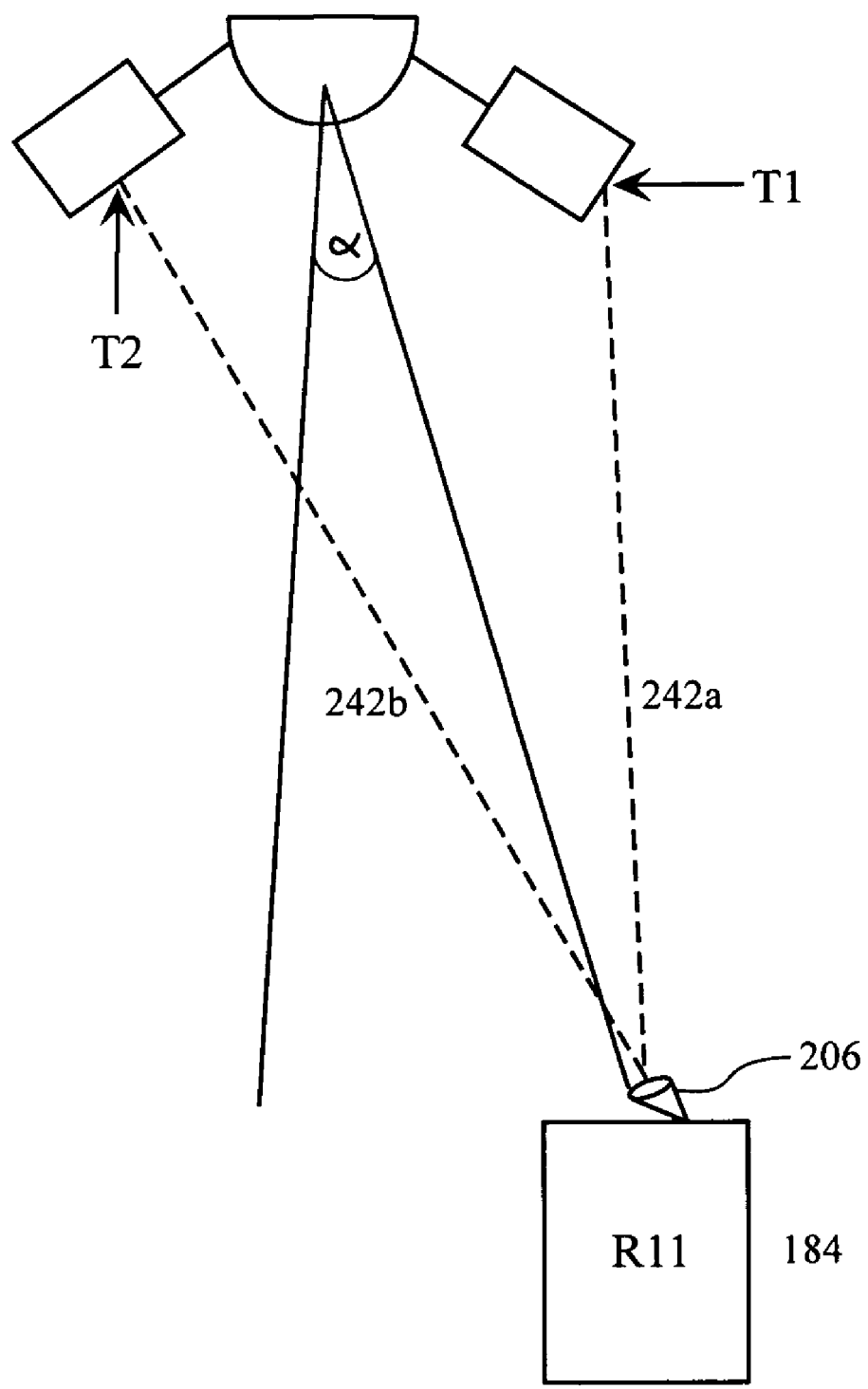
FIG. 3A is a simplified block diagram of two exemplary streams of acoustic signals being generated by the acoustic transmitter device defined on top of a rack, in accordance with another embodiment of the invention.
Figure 3B:
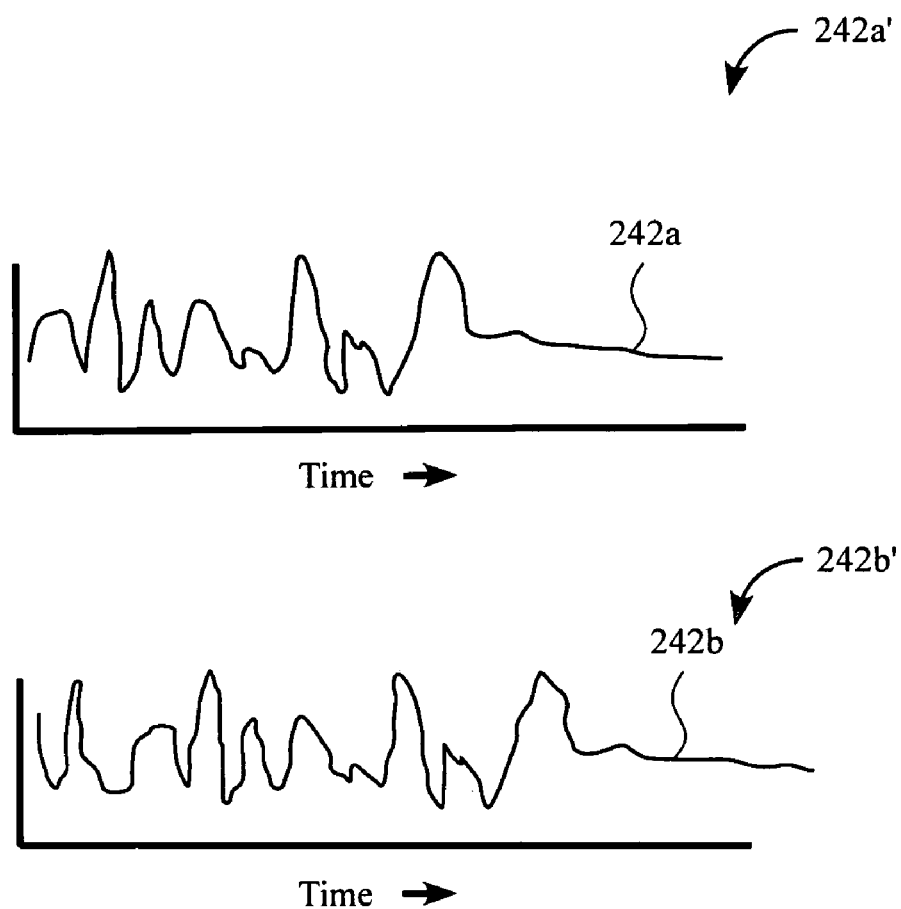
FIG. 3B is a frequency versus time diagram of streams of acoustic signals depicted in FIG. 3A, in accordance with another embodiment of the invention.
Figure 3C:
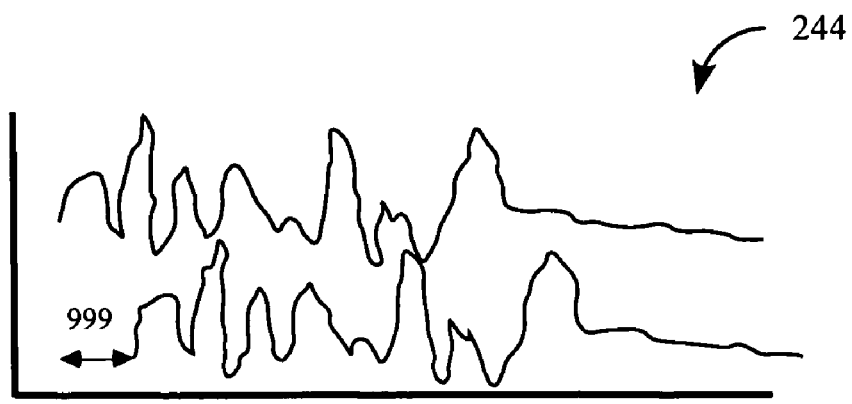
FIG. 3C shows a delay between the arrival times of the two streams of acoustic signals depicted in FIG. 3B, in accordance with another embodiment of the invention.

FIGS. 3A–3C illustrate using the arrival-time correlation method to ascertain the locale of the rack 184 in the physical space, in accordance with one embodiment of the present invention. The arrival-time correlation method is used by living animals to locate sounds in space. To numerically correlate the waveforms arriving at multiple sensors, the sensors are defined in close proximity to one another herein referred to as being "compact sensors." In one example, the sensors are defined about 10 to 30 centimeters apart from one another. The arrival-time correlation method continuously computes a correlation based on various time-shifted replicas of the waveforms. The time-shift giving the best correlation is used to represent the true arrival time asynchrony of the various waveforms. Once true arrival-time asynchrony is determined, the radial direction (i.e., azimuth) of the source can be computed. Thereafter, distance is computed by using two sensors defined sufficiently apart in space. At this point, each sensor computes a direction of the waveforms, which can be used to triangulate the locale of the source within the space.

In FIG. 3A, two exemplary streams of acoustic signal 242*a* and 242*b* are shown to be generated by the acoustic transmitter 206 defined on top of the rack 184. The arrival of the acoustic signal 242*a* at the compact sensor 138*a* is defined as time T1, and the arrival of the acoustic signal 242*b* at the compact sensor 138*b* is defined as time T2. The compact sensor 138*a* is shown to be closer to the acoustic transmitter 206 than the compact sensor 138*b*. Thus, the compact sensor 138*b* picks up the stream of the acoustic signal 242*b* at a later time T2. As can be seen, an angle α is determined by the temporal delay between the arrival time T1 of the stream of acoustic signal 242*a* and the arrival time T2 of the stream of acoustic signal 242*b*.

The localizing acoustic system of the present invention can be configured to perform in physical spaces represented by interior rooms or small exterior spaces (e.g., "human" scale physical spaces, etc.). In one example, the localizing acoustic system of the present invention can be implemented to pinpoint a position of a computer system having a distance ranging from approximately 1 meter to 50 meters from the compact sensors. Furthermore, in one embodiment of the present invention, a single signal processor using a pair of array of compact sensors can be implemented to determine the direction of a transmitting source. However, in a different embodiment, two or more acoustic signaling systems can be implemented in parallel so as to arrive at a substantially exact distance from the transmitting source.

FIG. 3B depict plots 242*a*' and 242*b*' showing the stream of acoustic signals 242*a* and 242*b* versus time, as sensed by compact sensors 138*a* and 138*b*, respectively, in accordance with one embodiment of the present invention. Plot 244 of FIG. 3C shows the best match of the autocorrelation with a delay 999 between the arrival time T1 of the acoustic signal 242*a* at the compact sensor 138*a* and the arrival time T2 of the acoustic signal 242*b* at the compact sensor 138*b*, in accordance with one embodiment of the present invention. As will be explained in more detail below, the computer software analyzes the streams of acoustic signals 242*a* and 242*b* having arrival time T1 and T2 at the compact sensors 138*a* and 138*b*, respectively. Thereafter, the computer signal finds the best match using correlation.

In a different embodiment, distributed sensor/time of flight method can be used to determine the locale of the failed computer system. In the distributed sensor/time of flight method, the signal processor of the localizing acoustic system records the time at which the acoustic signal left the rack 184 (i.e., the source) and knows the speed at which sound travels in the air. Using the arrival time as well as the speed of sound, the system can calculate the distance between the rack 184 and each sensor of array of compact sensors 138a and 138b. In accordance with one example, the sensors are configured to be defined in space such that the distances between the sensors and the source are sufficiently different. For instance, in the latter method, the sensors are configured to be defined apart such that a distance of several feet exists between two adjacent sensors. Thereafter, triangulation can be used to determine the locale of the rack 184 in the physical space. The triangulation method has been described in more detail with respect to FIG. 3A.

In a different embodiment, a radio pulse can be emitted substantially at the same time as the time the acoustic signal is being emitted. The difference between arrival times of the radio signals and the acoustic signals provide the time of flight.

In yet another embodiment, echolocation method can be used to ascertain the locale of the rack 184 in the physical space. In the echolocation method, the receiver (e.g., the array of compact sensors 138a and 138b) is also configured to also be the source (e.g., the rack 184). In the latter method, the receiver sends out an acoustic signal and awaits receiving the acoustic signal after the signal bounces off objects defined in space. The delay and spatial patterns of the returning echoes allow the sender to compute location of objects.

The arrival-time correlation method can be more sensitive than the time of flight thus allowing the array of compact sensors 138a and 138b to be defined closer together to one another in space. Furthermore, the arrival-time correlation method can be considered to be a passive method as opposed to the echolocation as the array of sensors 138a and 138b do not send out the respective signals.

Figure 4:
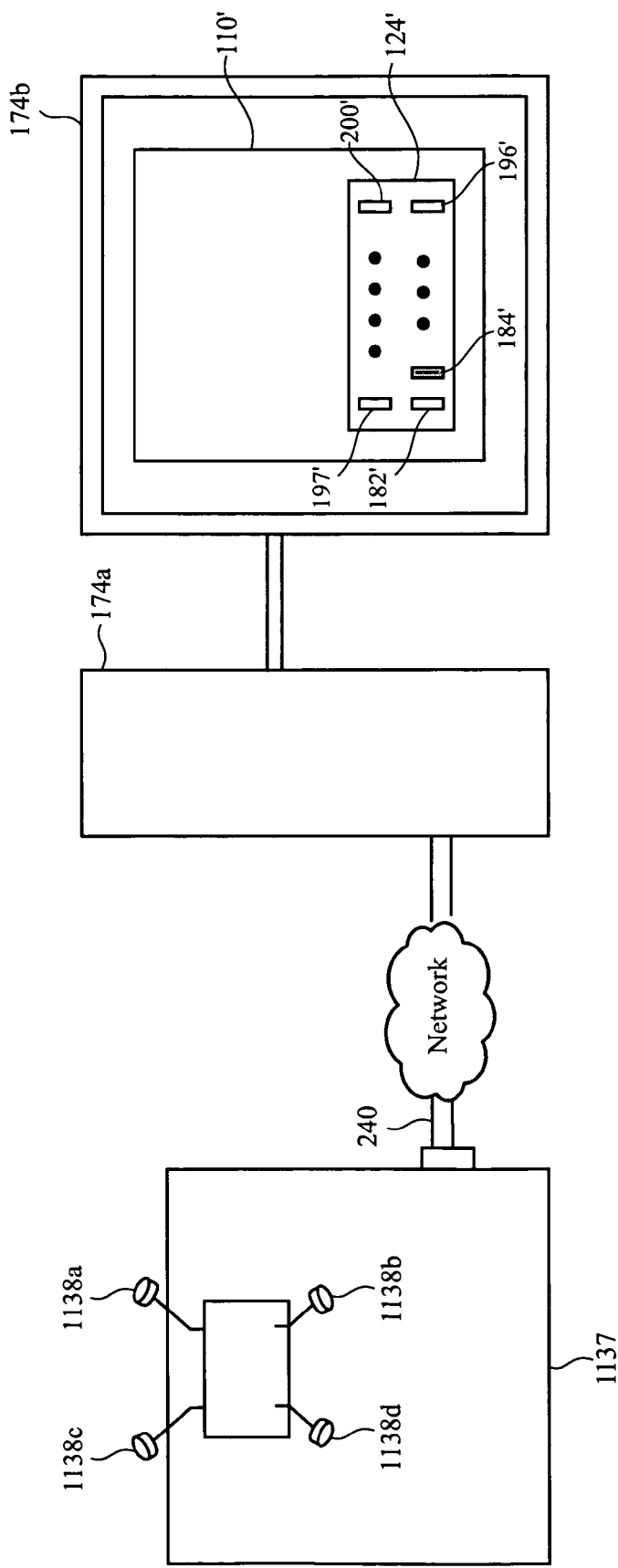
FIG. 4 is a simplified block diagram illustrating the ascertaining of the location of a failed computer system within a rack using the localizing acoustic system of the present invention, in accordance with still another embodiment of the invention.

Shifting to FIG. 4, ascertaining the locale of the failed computer system within a rack using the localizing acoustic system of the present invention is depicted, in accordance with another embodiment of the present invention. As shown, the signal processor 1137 of the embodiment shown in FIG. 4 includes four compact sensors 1138a–1138d. In accordance with one embodiment, each of the compact sensors 1138a–1138d is configured to capture the stream of acoustic signals broadcasted by the acoustic transmitter device defined on top of the rack containing the failed computer system.

Thereafter, the captured streams of acoustic signals are provided to the signal processor 1137 wherein the streams of acoustic signals are converted to digital signals. At this point, the output of the signal processor 1137 is sent to the computer system 174a using any standard communication method. In one example, the computer system 174a running the computer software can process the digital signals using triangulation. Once the locale of the rack containing the failed computer system is ascertained, a perceived direction of the source of streams of acoustic signals can be shown on a display 174b connected to the computer system 174a.

In the embodiment shown in FIG. 4, a structure location 110' of the structure 110 including a system site location 124' is shown on a map depicted on the display 174b. As depicted, a plurality of rack locations 182'–200' of corresponding racks 182–200 are shown in the system site location 124', with the rack location 184' representing the location of the rack 184 including the computer system being down. As was explained in more detail above, the computer system 174a can be a dedicated personal computer being used to solely place the locale of the failed computer system. In a different embodiment, however, the computer system 174a can be an undedicated computer system configured to process a plurality of jobs in addition to localizing the source of streams of acoustic signals.

In one embodiment, the computer software performs the arrival-time correlation method by taking time-slices of incoming acoustic waveforms and performing multiple iterations of a correlation operation. After completing all the correlation iterations, the computer software uses statistical methods to find the best correlation (i.e., best arrival-time offset) which is used to account for the incoming signal. In accordance with one example, the computer software can be enhanced so as to perform signal-clarity functions. By way of example, the computer software can be tuned to look at certain frequency components of an incoming signal (e.g., sounds higher than 8 kilohertz in frequency, sounds with a particular temporal characteristic (e.g., "on-off-on-off," etc.), etc.). The computer software can further maintain a persistent store of incoming sounds and choose to ignore frequencies and/or locations that are consistently present in the background. That is, the computer software can adapt to the characteristics of the background (i.e., learn the characteristics of the background) a feature usually achieved in biological systems. The ability of the computer software to learn and adapt to the characteristics of the background enables the system to respond selectively to some signals while ignoring others.

Another feature of the computer software used in the acoustic localizing system of the present invention is that the computer software can analyze incoming waveforms so as to identify the source of a signal. For instance, the source can be configured to have a distinctive chirp that identifies the source as for example, a particular model of server. The source can further include identifying information encoded at an arbitrarily comprehensive level of detail (e.g., serial number, etc.) by encoding the information into the acoustic signal in a variety of possible ways (e.g., telegraphic encoding, frequency encoding, duration encoding, etc.).

Still another feature of the computer software is that the software can be tuned and the speaker sources can be chosen so as to place the acoustic signaling outside the range of human hearing. An applied aspect of acoustic signaling system is that the chirp generated by the source should be identified by the system and the computer software. However, the chirping should not be heard or used by human beings as the chirping can be distracting to the human operator. In this manner, the acoustic localizing system of the present invention enables automating the localization of objects. In another embodiment, the computer software can be used to generate a map of all the units defined in a data center for future reference.

One of ordinary skill in the art must further note that two compact arrays of sensors can pinpoint any location in a two-dimensional plane. Thus, by adding a third compact array of sensors, any location in the three-dimensional space can be located. In this manner, the acoustic localizing system of the present invention can distinguish between objects resting on the floor (two dimensions) as opposed to objects defined suspended in the space. Additionally, the accuracy of the acoustic localizing system of the present can be enhanced by implementing multiple pairs of sensors in each array of compact sensors. Thus, in one exemplary embodiment, a spherical array can be used wherein microphones are encrusted almost over the entire surface of the sphere. For instance, the spherical array can include any number of sensors (e.g., 100, etc.), thus allowing the inputs of all the sensors to be used to perform the signal processing of the present invention, providing greater sensitivity and accuracy.

Figure 5:
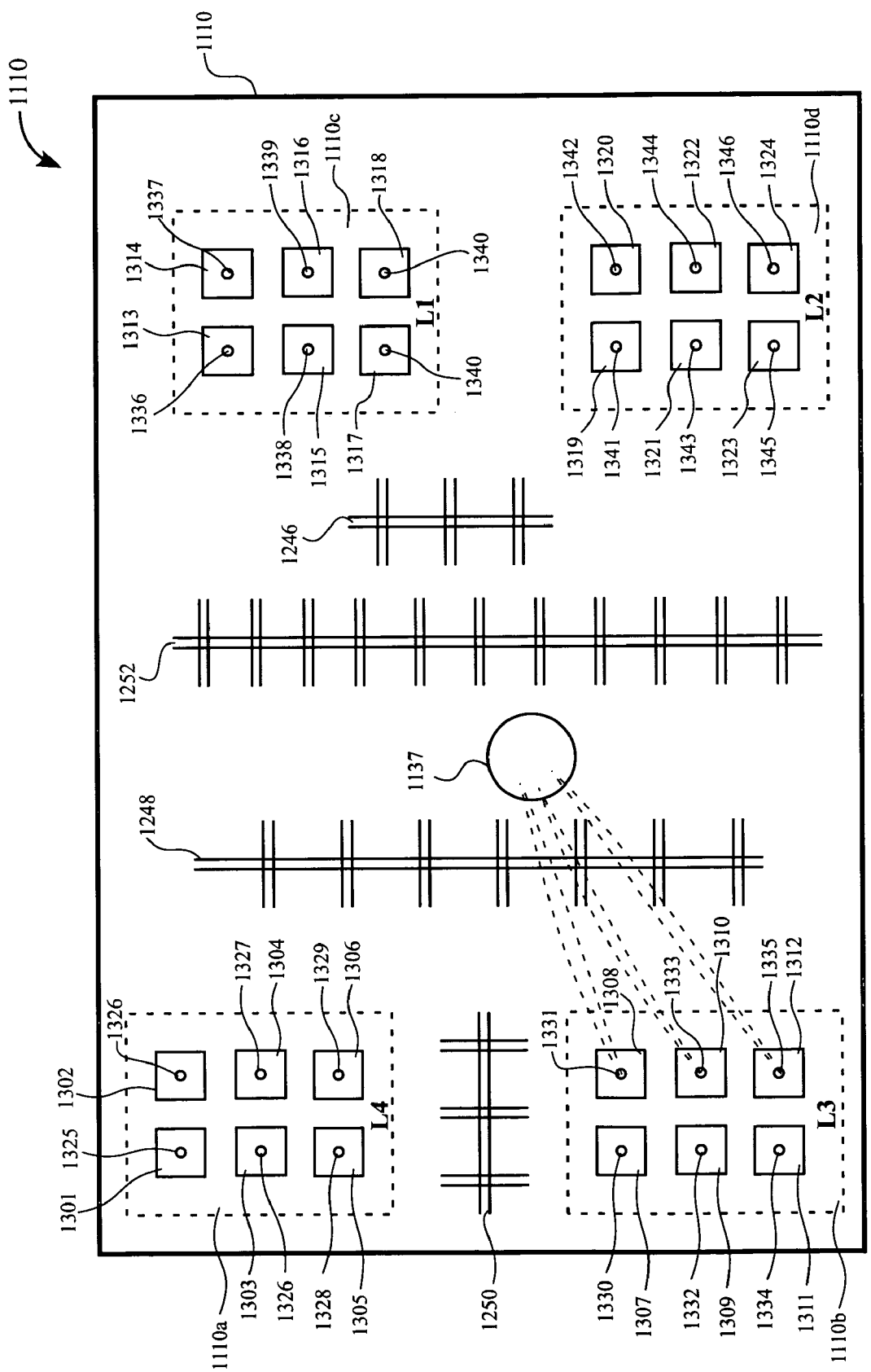
FIG. 5 is a simplified top view diagram of a floor of a data center structure, in accordance with still another embodiment of the invention.

Proceeding to FIG. 5, a simplified top view diagram of a floor 1110 of a data center structure 1101 is shown, in accordance with one embodiment of the present invention. As illustrated, the floor 1110 houses a plurality of racks 1301–1324. Respective acoustic signal emitter devices 1325–1345 are shown to be defined on top of respective racks 1301–1324. In the embodiment shown in FIG. 5, a plurality of cubicle sets 1246–1252 is also defined on the floor 1110 of the data center, each set including a plurality of cubicles.

In one example, as shown in FIG. 5, the plurality of racks 1301–1324 can be divided into four separate locations 1110a–1110d. Racks 1301–1306 are defined in the upper left hand quadrant in the location 1110a, racks 1307–1312 are defined in the lower left hand quadrant in the location 1110b, racks 1313–1318 are defined in the upper right hand quadrant in the location 1110c, and racks 1319–1324 are defined in the lower right hand quadrant in the location 1110d. Thus, the sets of cubicles 1246–1252 are shown to be dispersed on the floor 1110. In accordance with the embodiment of FIG. 5, an acoustic signal processor 1137 is shown to be affixed to the ceiling of the floor 1110 so as to capture the streams of acoustic signals dispatched by any of the racks 1301–1324.

The background noise in the floor 1110 can be relatively pronounced because humans may be stationed at the cubicles 1246–1252 and may engage in activities that generate acoustic noise (e.g., talking, moving things around, typing at terminals, opening/closing drawers and cabinets, etc.). According to one embodiment of the present invention, the streams of acoustic signals generated by each rack are configured to be unique as opposed to the background noise. One must note that the background noise can include any noise generated within the data center. For instance, noise generated by human beings as well as the noise made by the data center.

In accordance with one implementation of the present invention, the streams of acoustic signals generated by each of the acoustic transmitter devices are configured to be distinctive so that signals can be easily differentiated thus eliminating the possibility of generating any false alarms. Depending on the environment, the streams of acoustic signals can be selectively heard by humans. For instance, in one data center structure, the streams of acoustic signals may be a distinctive song that can be heard and recognized by humans. In another instance, however, the streams of acoustic signals can have a high frequency so that the streams of acoustic signals cannot disturb humans working on the floor. In a different embodiment, when creating a map of the data center, the stream of acoustic signals may be configured to be more subtle so as to not perturb humans. Additionally, depending on the environment, the streams of acoustic signals can be generated by economical acoustic signal emitter devices and be captured by reasonably priced compact sensors (e.g., off-the-shelf compact sensors can easily obtain signals having a frequency ranging between approximately 8 KHz and about 18 KHz, etc.).

Corresponding to one embodiment of the present invention, the stream of acoustic signals can be a stream of short, sharp, and optionally repetitive sounds, hereinafter referred to as "chirps." In one aspect, the chirps are configured to have a known frequency (i.e., pitch) and may be configured to be supersonic to the human ear. For instance, the streams of chirps may include a unique number, frequency envelope, temporal profile, or any other identifying information. In this manner, the acoustic localizing system of the present invention can be configured to look for and capture a stream of acoustic signals having a specific pitch and then filter out any irrelevant sounds.

Additionally, in accordance with one embodiment of the present invention, the stream of chirps can be encoded so as to include certain information. For instance, in one embodiment, the stream of chirps can be configured to have a specific frequency and time profile indicative of a particular purpose (e.g., calibration, locating a computer system upon user's request, defective computer component, computer system serial number, etc.). In one example, the user can be a system administrator of Sun Microsystems, Inc. or the customer's, a help desk person, a service dispatcher or manager responsible for sending service personnel out to the customers' sites, etc.

In the embodiment shown in FIG. 5, racks 1308, 1310, and 1312 are chirping using the respective acoustic signal emitters 1331, 1333, and 1335. The streams of chirps dispatched by each of the acoustic signal emitters 1331, 1333, and 1335 are shown to be captured by the acoustic signal processor 1137. The acoustic signal processor 1137 has substantially adapted to the background noise generated within the data center floor 1110 and as such, is capable of sensing and capturing the streams of chirps generated by the acoustic signal emitters 1331, 1333, and 1335.

As explained in more detail above, the array of compact sensors affixed to the acoustic signal processor 1137 captures the stream of chirps and subsequently provides same to the acoustic signal processor 1137 so that the stream of chirps can be converted to digital signals. Next, digital signals are sent to the processing computer system executing the computer software so as to determine the locale of the sources generating the streams of chirps. The locale of each rack is then communicated to the system administrator.

At this point, in one aspect of the present invention, the system administrator can be informed that racks 1308, 1310, and 1312 are defined substantially in the same region, in the bottom left quadrant 1110b of the data center floor 1110. In this manner, the system administrator can recognize that the cause of system failure in racks 1308, 1310, and 1312 may be attributed to an external factor (e.g., geographical factors, etc.) that can affect the lower left hand quadrant 1110b of the floor 1110 (e.g., lack of adequate air conditioning, power failures (e.g., resulting from a faulty plug, power strip, or other local problems, etc.), moisture (e.g., resulting from roof leaks or humidity variations inside the room, etc.), temperature irregularities (e.g., resulting from failed room air conditioning, blocked cooling vents, etc.), cable problems (e.g., resulting from the network cable getting loose), etc.). The acoustic localizing system of the present invention can be used to advise the service person in charge of repairing and maintaining computer systems not only of the approximate locale of the racks including the failed computer system but also of the cause of the problem, thus substantially reducing time associated with finding and identifying the sources of the problems.

It must be noted that in one example, the racks 1308, 1310, and 1312 may start chirping substantially at the same time. In such scenario, in accordance with one aspect of the present invention, the stream of chirps can each be attributed to the associated rack, as each chirp can include information that can be used to easily identify the applicable rack. For instance, the stream of chirps associated with each rack can be encoded to include the serial number of the respective rack, thus enabling the system administrator to easily recognize and distinguish the rack individually.

Figure 6A:
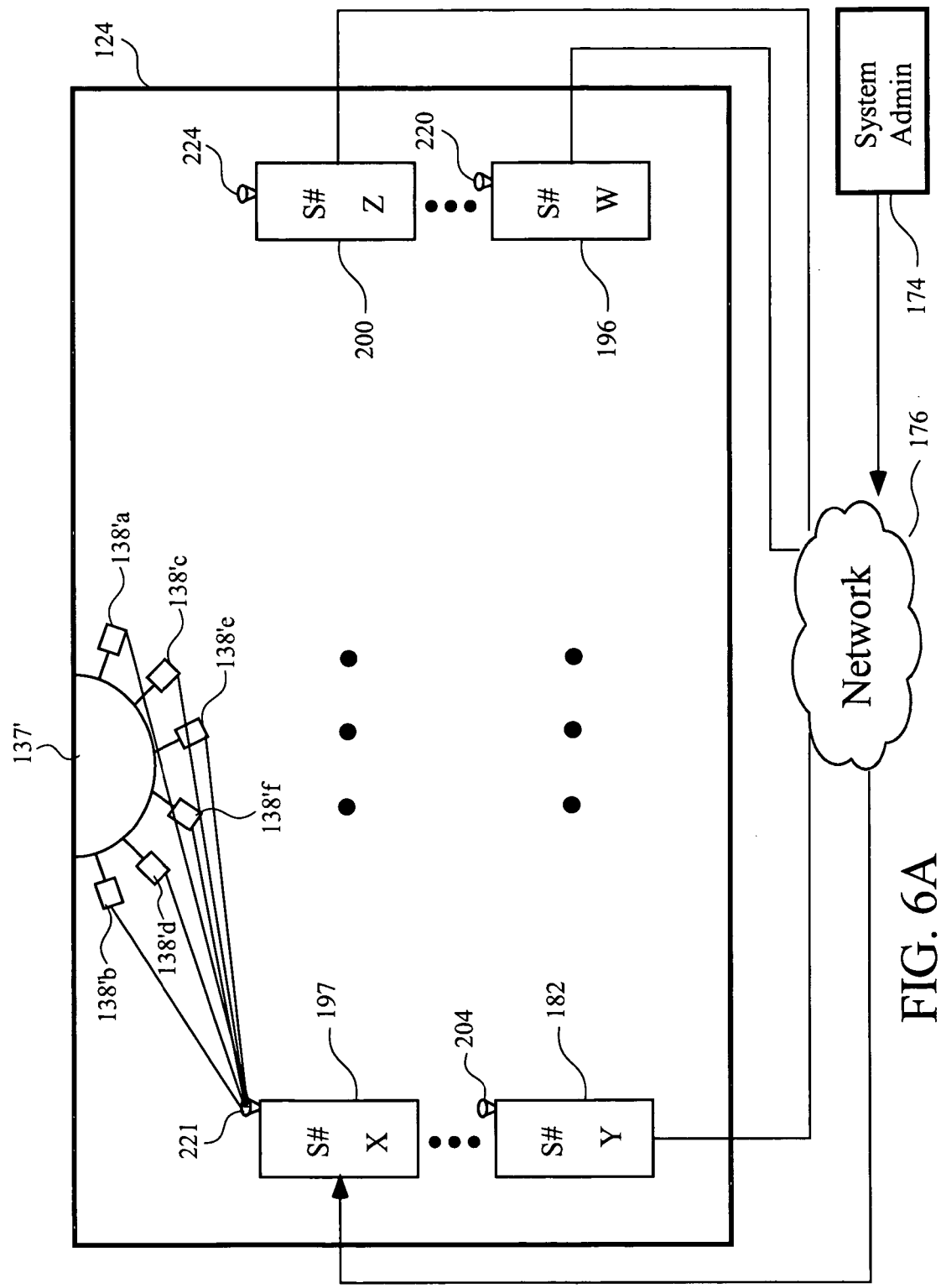
FIG. 6A is a simplified block diagram illustrating the generation of a spatial map of a floor of a data center using the acoustic localizing system of the present invention, in accordance with still another embodiment of the invention.

Shifting to FIGS. 6A–6E, generation of a spatial map of a floor of a data center using the acoustic localizing system of the present invention is shown, in accordance with one embodiment of the present invention. In one embodiment, generating the spatial map of the racks defined on the floor 124 of the data center starts by the system administrator 174 issuing commands to each of the racks 182–200, sequentially, requesting each rack 182–200 to generate a particular stream of chirps. For instance, as depicted in FIG. 6A, the system administrator 174 has requested the rack 197 to start chirping. In one example, the system administrator 174 can dispatch a chirp having a particular pattern specifically associated with the rack 197 and thereafter, requesting that rack 197 generate the dispatched chirp in the exact pattern. In this manner, if the system administrator 174 receives a chirp having the same particular pattern, the system administrator 174 can easily identify the rack that is chirping as well as the locale of the rack. However, one must appreciate that a spatial map of the data center can be generated in any appropriate manner (e.g., having the computer systems chirp in a pre-specified/known temporal order (e.g., the order of the objects in the database, etc.), etc.).

Figure 6B:
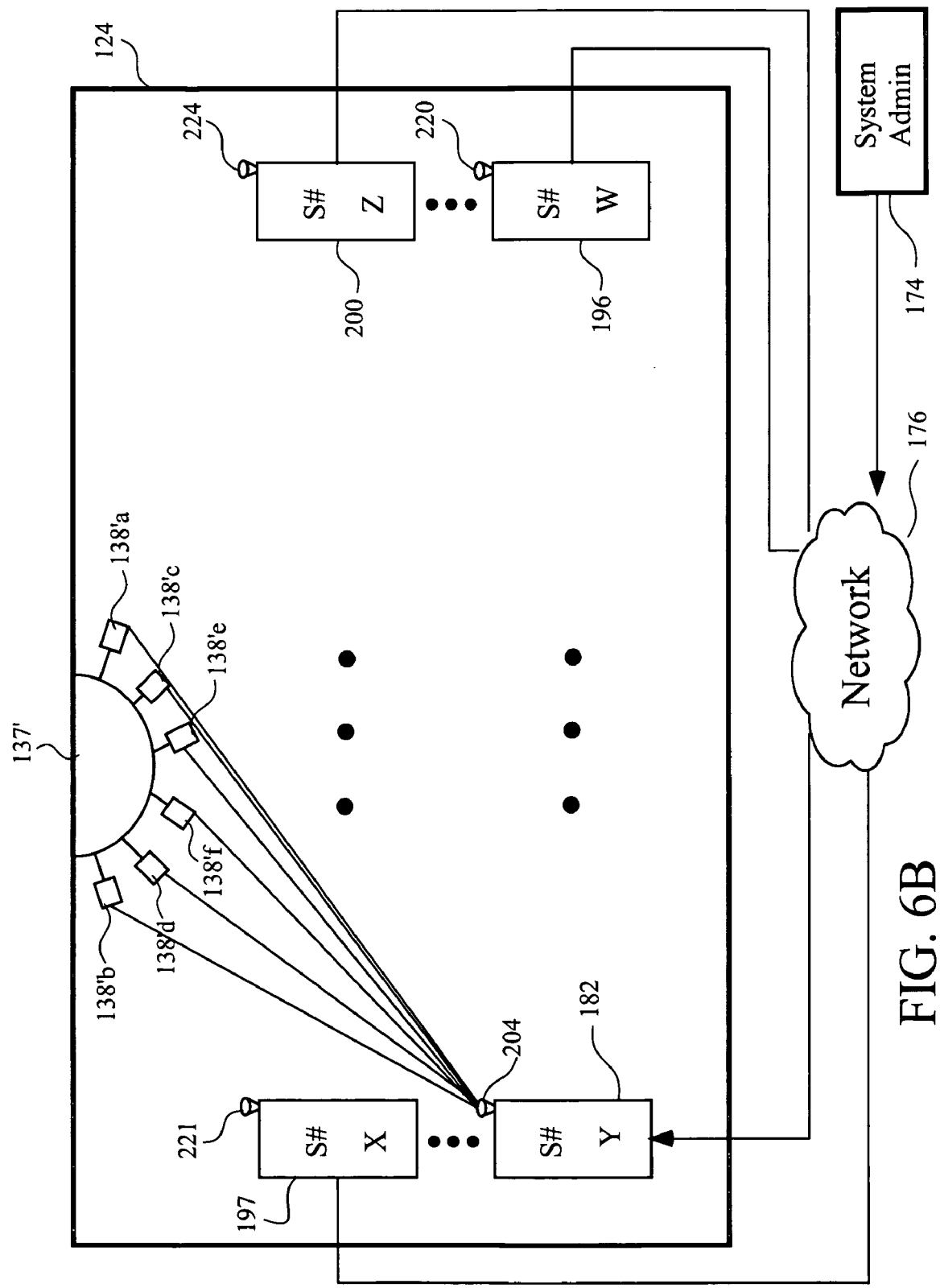
FIG. 6B is a simplified block diagram illustrating the generation of a spatial map of a floor of a data center using the acoustic localizing system of the present invention, in accordance with still another embodiment of the invention.
Figure 6C:
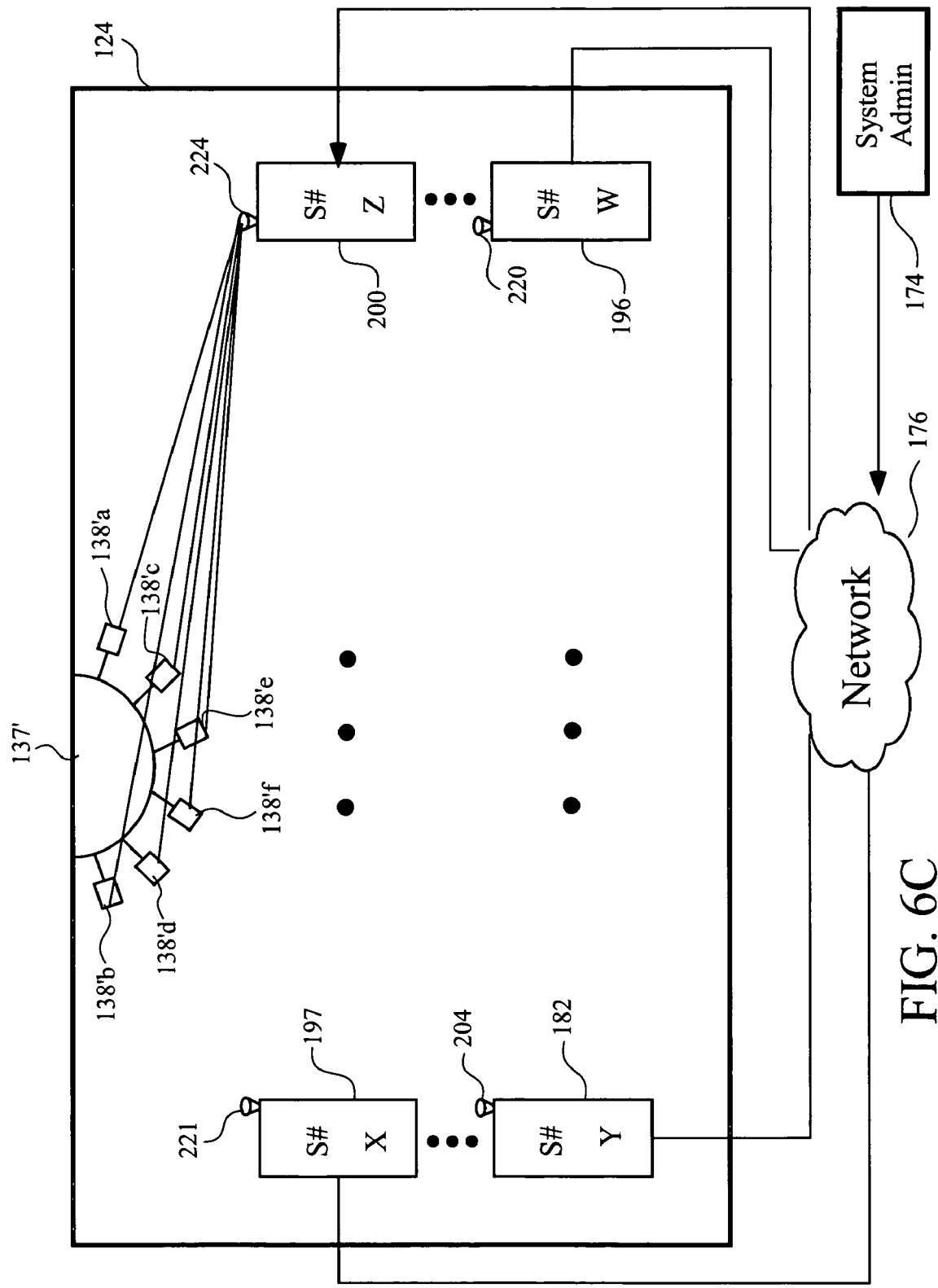
FIG. 6C is a simplified block diagram illustrating the generation of a spatial map of a floor of a data center using the acoustic localizing system of the present invention, in accordance with still another embodiment of the invention.
Figure 6D:
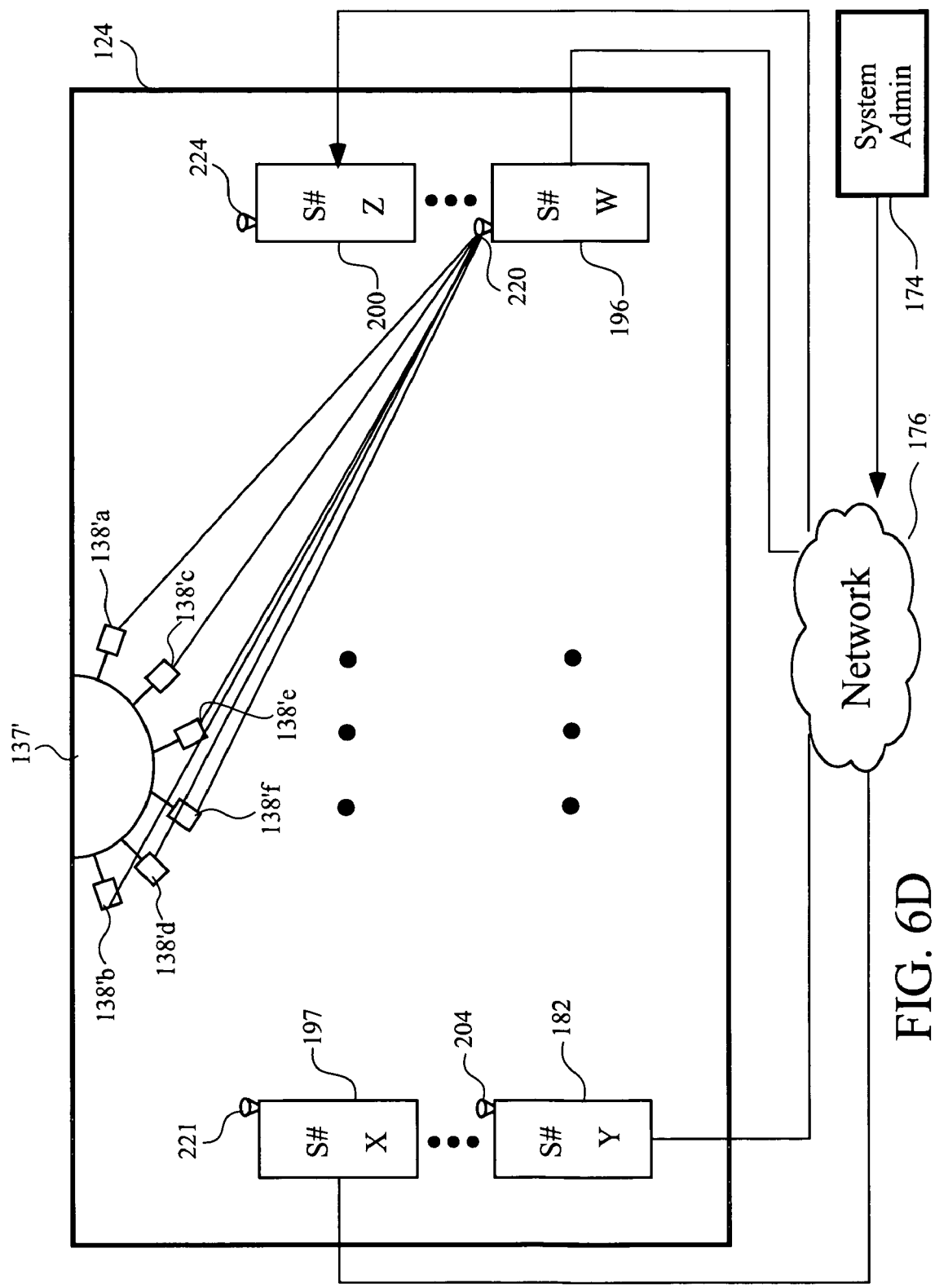
FIG. 6D is a simplified block diagram illustrating the generation of a spatial map of a floor of a data center using the acoustic localizing system of the present invention, in accordance with still another embodiment of the invention.
Figure 6E:
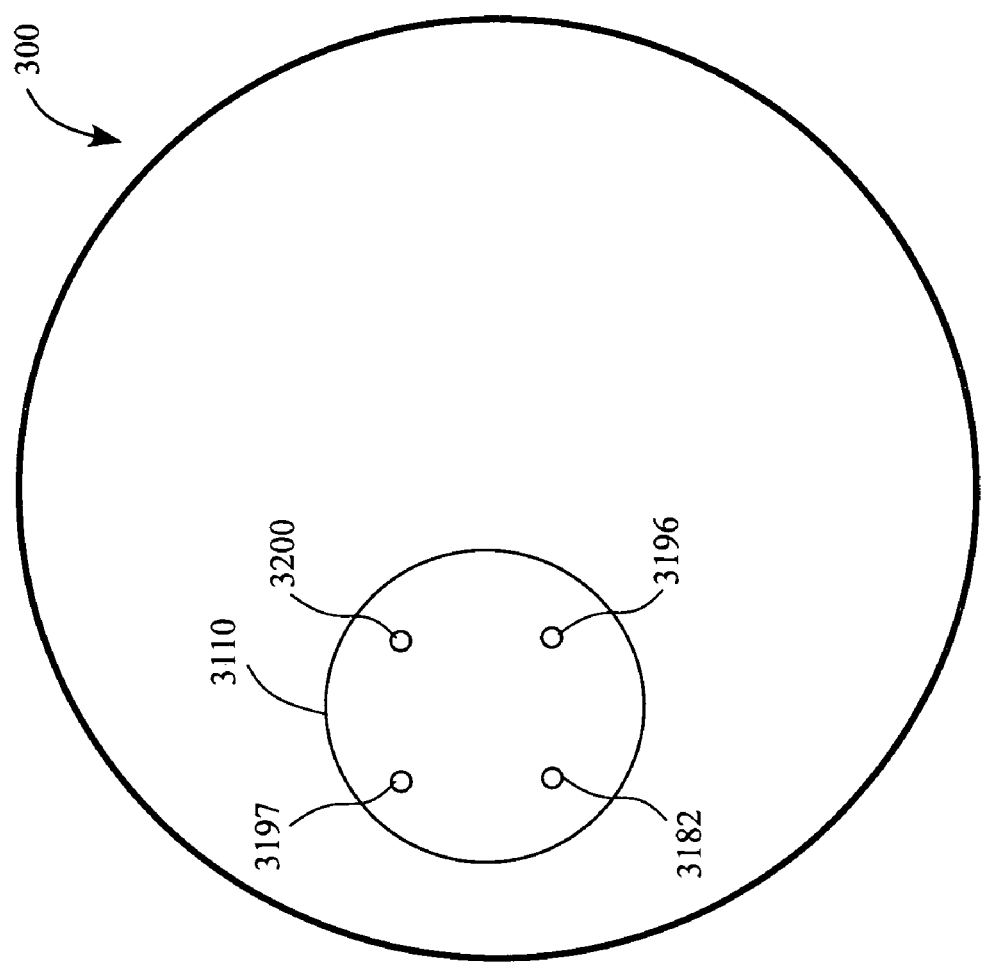
FIG. 6E is a simplified block diagram illustrating the generation of a spatial map of a floor of a data center using the acoustic localizing system of the present invention, in accordance with still another embodiment of the invention.

Continuing with creating the spatial map of the floor 124, as illustrated in FIG. 6B, the system administrator 174 next dispatches a specific chirp with a designated pattern to rack 182. Subsequently, the rack 182 starts chirping in the pattern identified by the system administrator 174. The streams of chirps are picked up by the compact sensors 138'a–138'f and are processed by the acoustic signal processor 137'. In this manner, the physical location of the rack 182 is ascertained. Likewise, the locale of the rack 224 is determined in the embodiment of FIG. 6C subsequent to which, in FIG. 6D, the physical location of rack 196 is determined. FIG. 6E depicts a spatial map 300 of an exemplary data center showing a spatial map 3110 of the floor 110 depicting rack locations 3197, 3182, 3200, and 3196 of applicable racks 197, 182, 200, and 196, in accordance with one embodiment of the present invention.

Figure 6F:
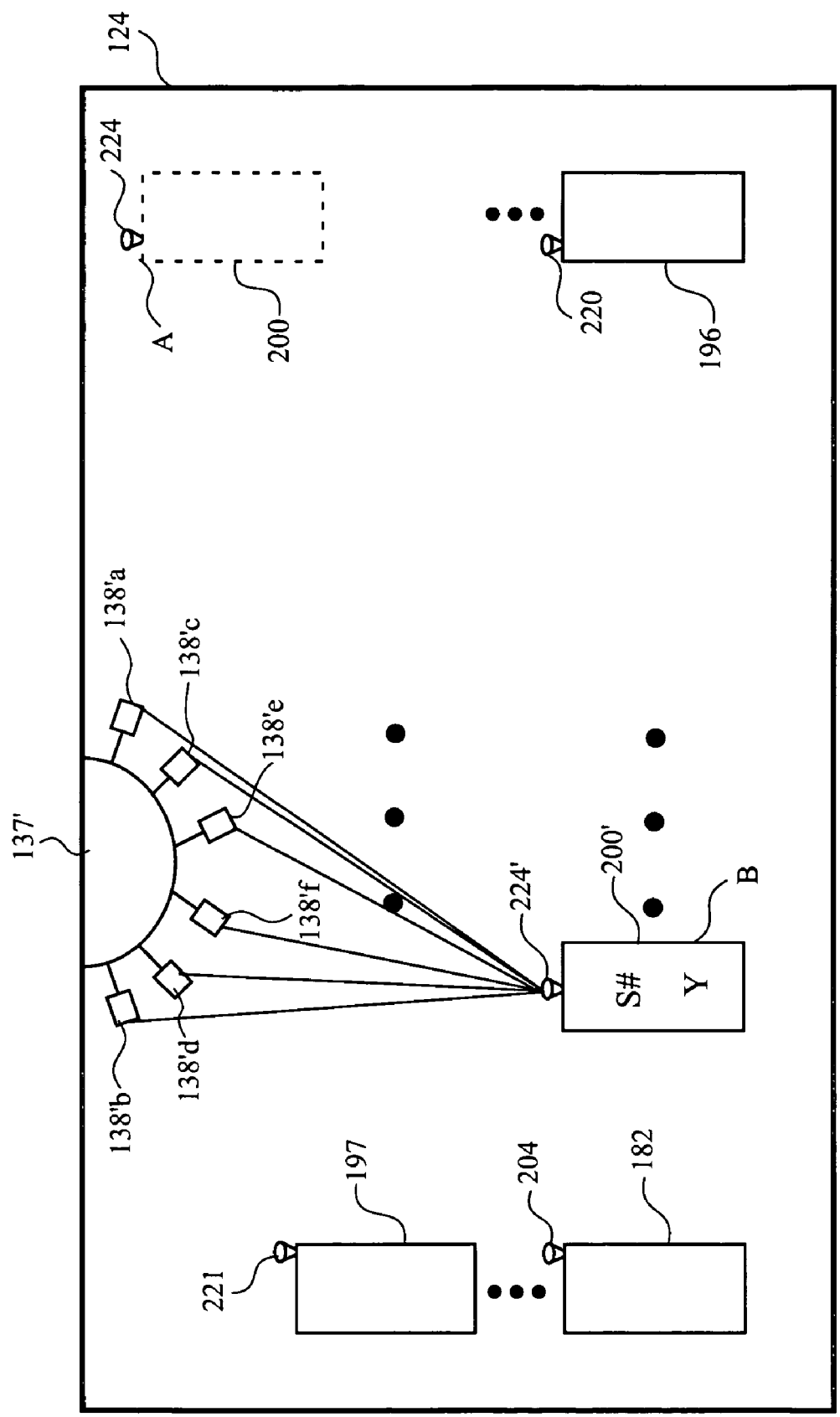
FIG. 6F is a simplified block diagram illustrating the generation of a spatial map of a floor of a data center using the acoustic localizing system of the present invention, in accordance with still another embodiment of the invention.
Figure 6G:
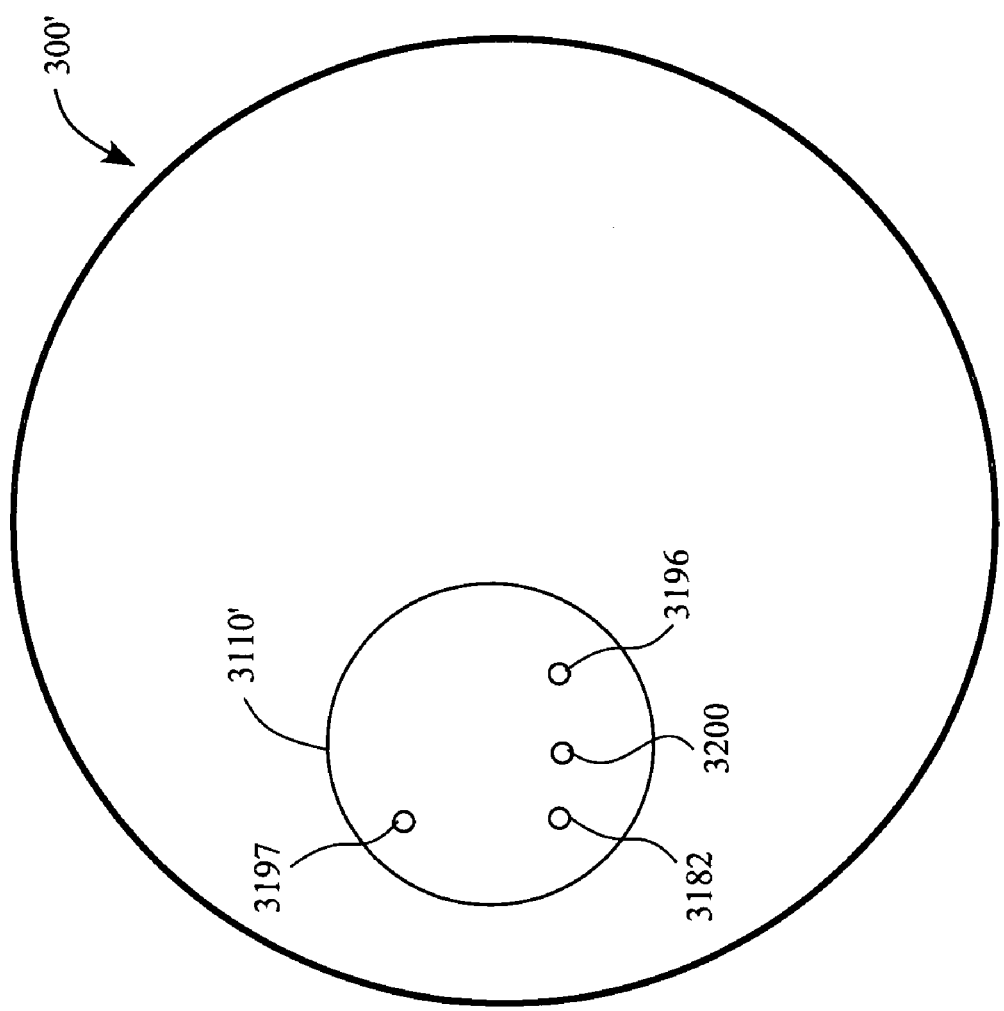
FIG. 6G is a simplified block diagram illustrating the generation of a spatial map of a floor of a data center using the acoustic localizing system of the present invention, in accordance with still another embodiment of the invention.

Proceeding to FIG. 6F, the floor 124 of the data center, is depicted wherein the rack 200 has been moved from the initial location A to a location B defined in the bottom quadrant of the floor 124 of the data center, according to one embodiment of the present invention. In this example, during the calibration of the acoustic localizing system, the system administrator can determine that rack 200 has been moved to a different physical location. In such a scenario, the newly received locale is used to update the spatial map 3110 of the floor 124. In this manner, beneficially, the spatial map 3110 of the racks in the data center is maintained updated even though the computer systems span different data center rooms, floors, buildings, or cities. FIG. 6G specifically depicts the updated spatial map 3110 of the floor 124 wherein the spatial location of rack 200 is shown to be in the bottom left portion of the floor 124. In one example, the calibration can be implemented during the initial setting up and installation of the system and in automatic intervals thereafter. Such system could be configured to perform calibration automatically at particular time intervals, and ship the results to a database. In this manner, the human administrator need not be involved.

By way of example, the calibration may be performed by triggering the chirping of a subset of racks whose locations are known (e.g., racks defined in the four corners of the system site, etc.). Furthermore, in accordance with one embodiment, the spatial map 3110 can be fed to various destinations (e.g., system management applications, inventory systems, etc.). Thus, the calibration can be implemented to update the database of geographical coordinates as well as to ensure the health of the computer systems in the network. However, one of ordinary skill in the art must appreciate that any sound source can be implemented to calibrate the system (e.g., servers, speakers mounted on a wall, generating a sound by a human, etc.).

Figure 7:
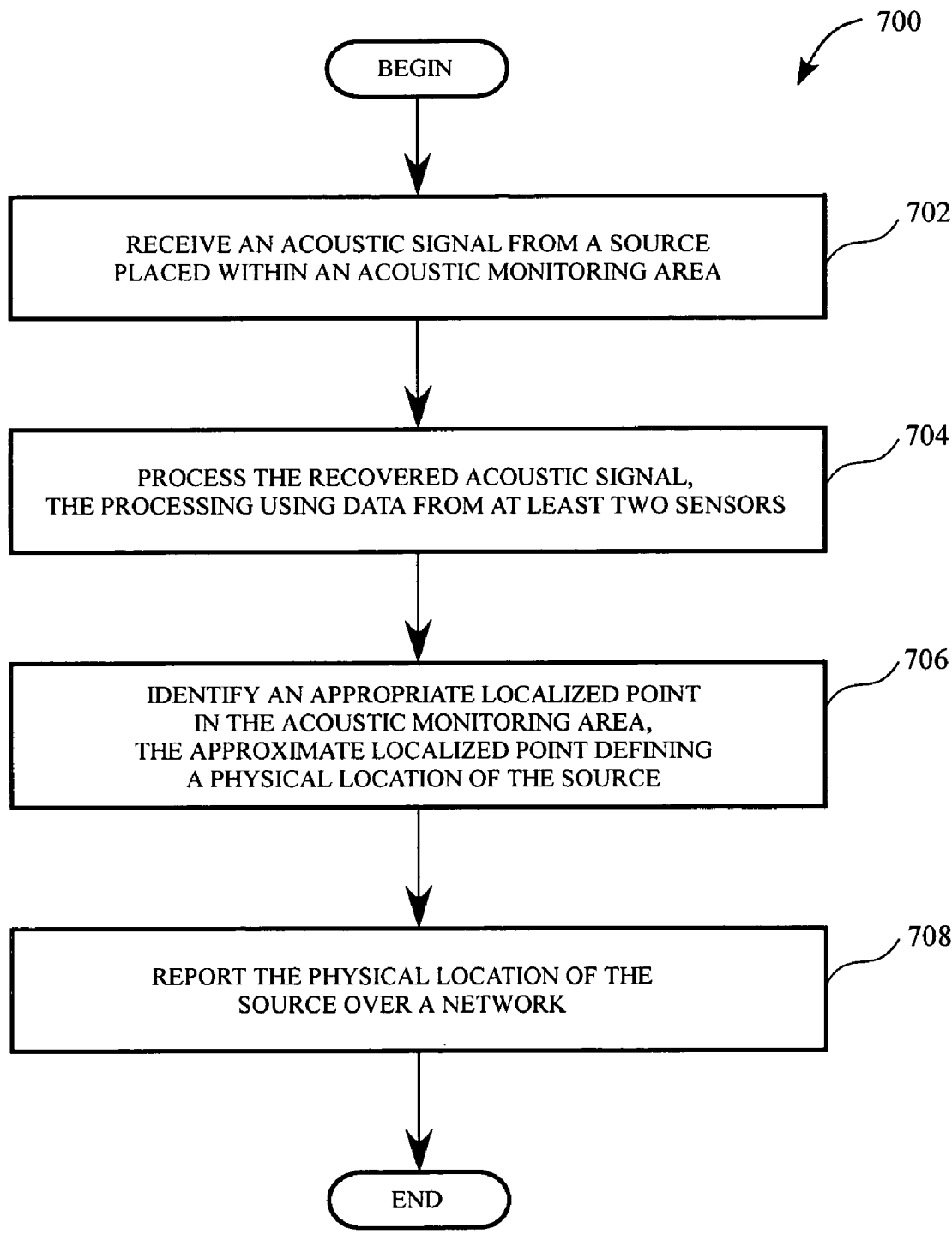
FIG. 7 depicts a flowchart diagram of method operations performed to determine a locale of a computer system in a data center, in accordance with yet another embodiment of the present invention.

Continuing to FIG. 7, a flowchart diagram 700 of the method operations performed to determine a locale of a source within an acoustic monitoring area, in accordance with one embodiment of the present invention. The method begins in operation 702 in which an acoustic signal is received from a source placed within an acoustic monitoring area. In one example, the source is a computer system defined within a data center. Next, in operation 704, the recovered acoustic signal is processed. In one embodiment, data from at least two sensors is processed.

Proceeding to operation 706, an approximate localized point in the acoustic monitoring area is identified. The approximate localized point defines a physical location of the source. Next, in operation 708, the physical location of the source is reported over a network. In one example, the physical location is reported using a dedicated personal computer to a system administrator using out-of-band communications.

Figure 8A:
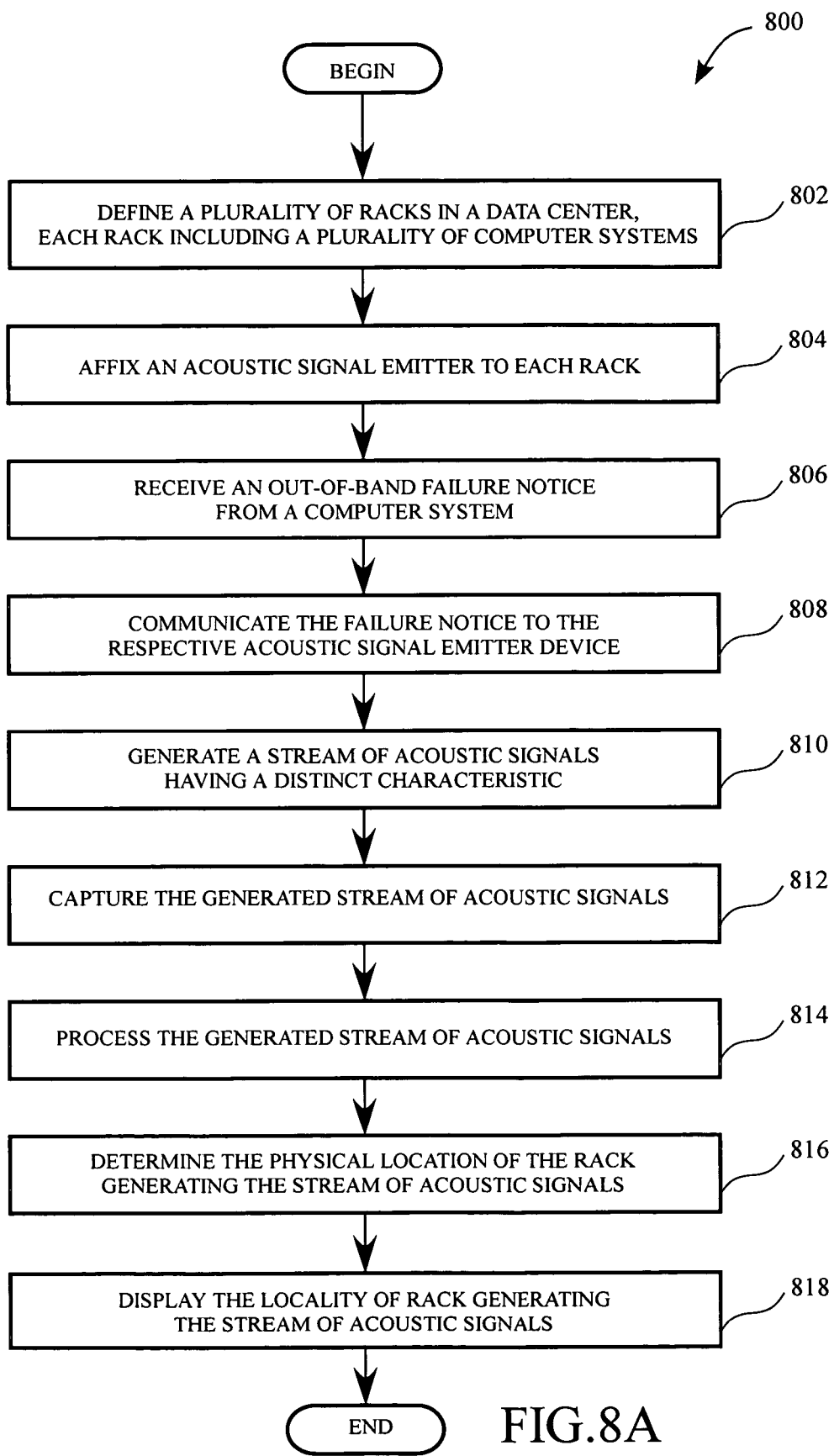
FIG. 8A depicts a flowchart diagram of method operations performed to determine a locale of a computer system in a data center, in accordance with yet another embodiment of the present invention.

Continuing to FIG. 8A, a flowchart diagram 800 of the method operations performed to determine a locale of a computer system in a data center is depicted, in accordance with one embodiment of the present invention. The method begins in operation 802 in which a data center including a plurality of racks is provided. Each rack can be configured to include a plurality of computer systems. Next, in operation 804, an acoustic signal emitter is affixed to each rack.

Thereafter, in operation 806, an out-of-band failure notice is received from a computer system. Proceeding to operation 808, the failure notice is communicated to the respective acoustic signal emitter device. Then, in operation 810, streams of acoustic signals having a distinct characteristic are generated. The generated streams of acoustic signals are captured in operation 812. In one example, an acoustic signal processor is implemented to capture the generated streams of acoustic signals. The method next processes the captured streams of acoustic signals in operation 814 followed by operation 816 in which the physical location of the rack generating the streams of acoustic signals is ascertained. Continuing to operation 818, the locale of the rack generating the streams of acoustic signals is displayed.

Figure 8B:
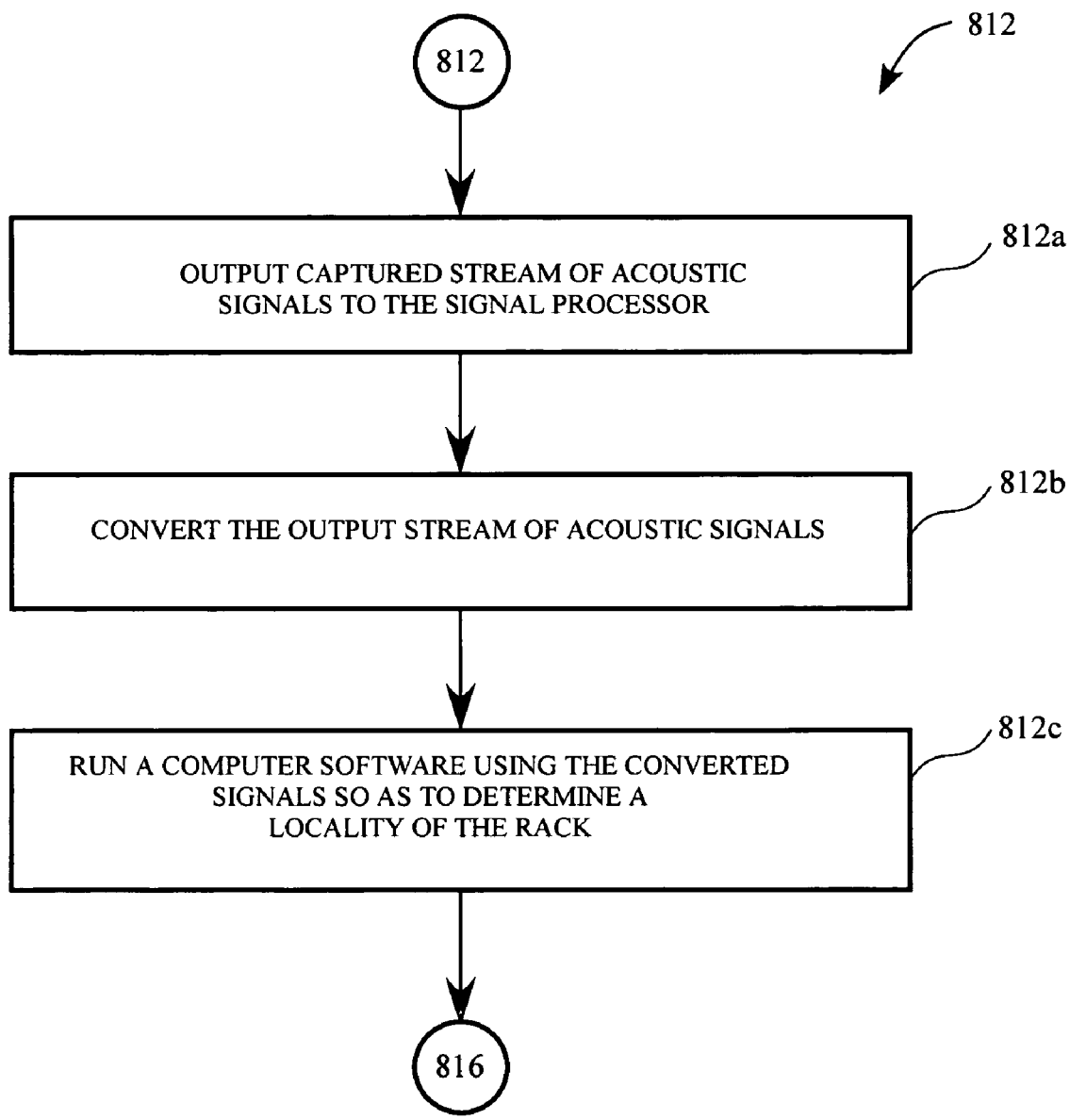
FIG. 8B depicts a flowchart diagram of method operations performed during the capturing of the generated streams of acoustic signals, in accordance with yet another embodiment of the present invention.

FIG. 8B depicts the operation performed during capturing of the generated streams of acoustic signals, in accordance with one embodiment of the present invention. In operation 812a, the captured streams of acoustic signals are sent to the signal processor. Next, in operation 812b, the output streams of acoustic signals are converted followed by operation 812c in which a computer software is run using the converted signals so as to determine the locale of the rack. Then, the method continues to operation 816.

Figure 9:
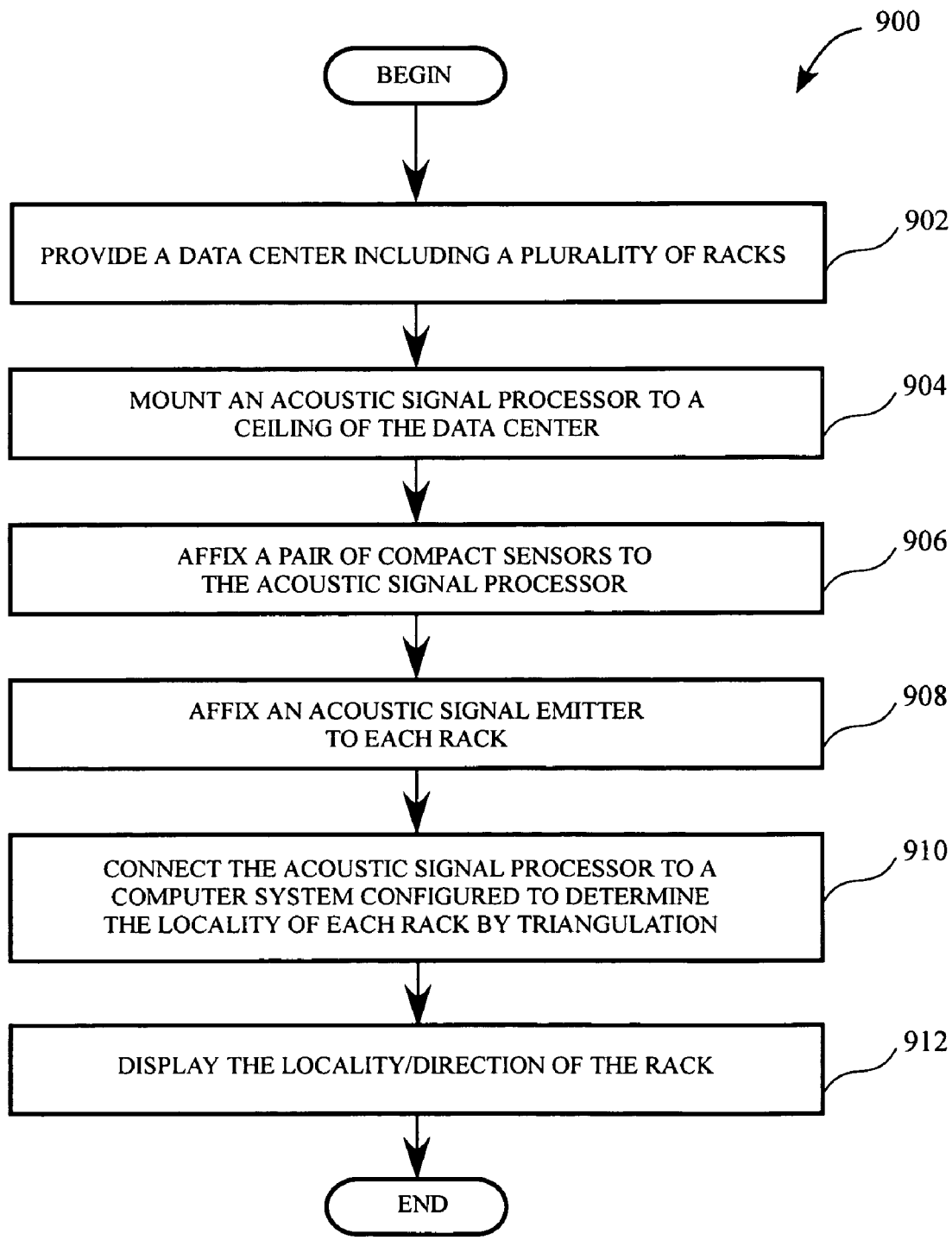
FIG. 9 is a flowchart diagram of method operations performed to determine the locale of a computer system in a data center, in accordance with yet another embodiment of the present invention.

Proceeding to FIG. 9, a flowchart 900 of the method operations performed to determine the locale of a computer system in a data center is provided, in accordance with another embodiment of the present invention. The method begins in operation 902 in which a data center including a plurality of racks is provided. Next, in operation 904, an acoustic signal processor is mounted to a ceiling of the data center followed by operation 906 in which a pair of compact sensors is affixed to the acoustic signal processor. Proceeding to operation 908, a signal emitter device is affixed to each rack. Next, in operation 910, the acoustic signal processor is connected to a computer system configured to determine the locale of each rack. In one embodiment, the locale of each rack is determined using arrival-time correlation. Thereafter, in operation 912, the locale/direction of the rack is displayed.

Figure 10:
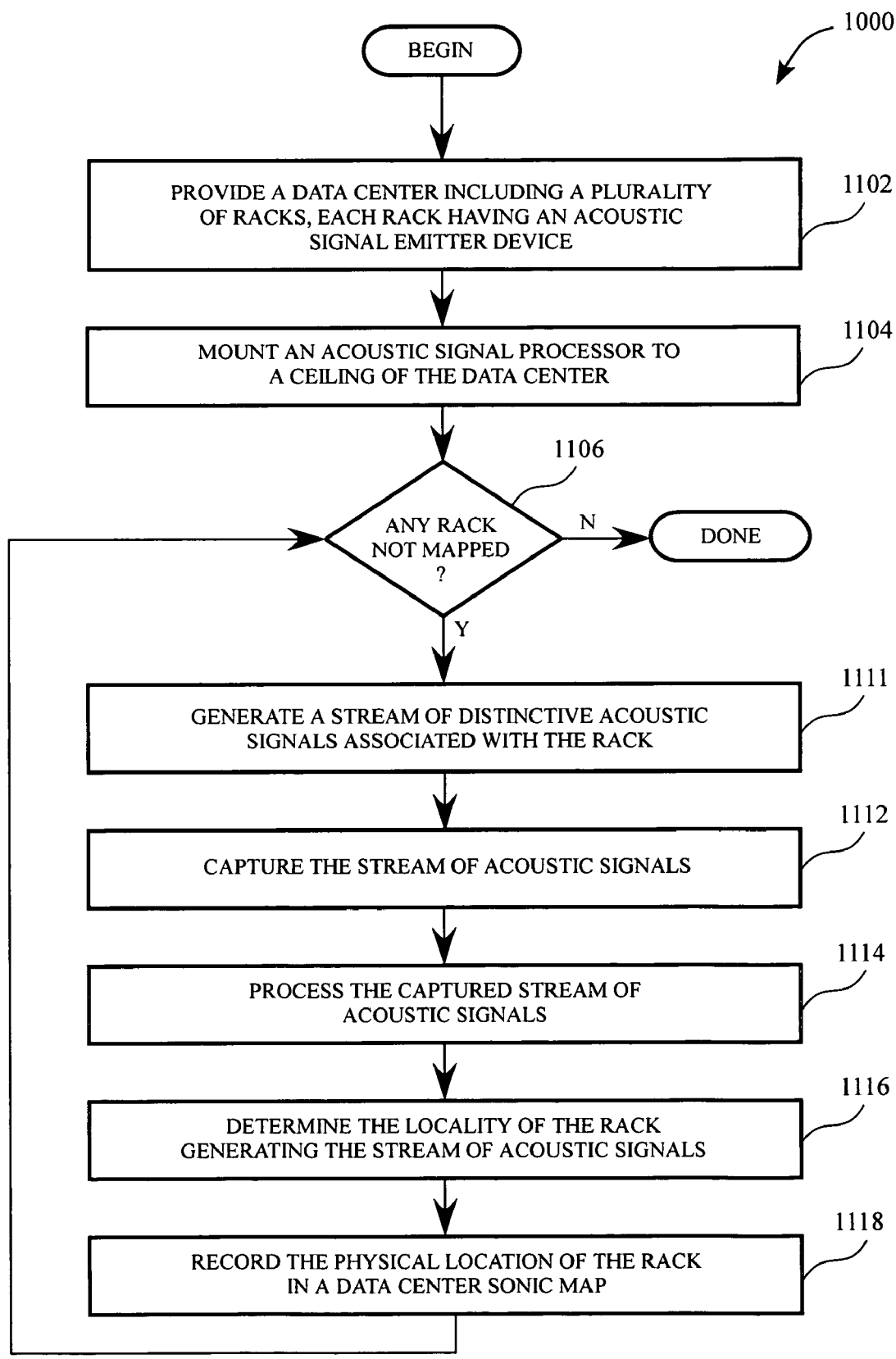
FIG. 10 is a flowchart diagram of method operations performed by an acoustic localizing system of the present invention, in accordance with yet another embodiment of the present invention.

Reference is made to FIG. 10 depicting a flowchart diagram 1000 of method operations performed by an acoustic localizing system of the present invention, according to one embodiment of the present invention. The method begins in operation 1102 in which a data center that includes a plurality of racks is provided. Each rack in the data center is configured to include a signal emitter device. In one example, the signal emitter device is mounted on top of each rack. Next, in operation 1104, an acoustic signal processor is mounted on a ceiling of the data center. In operation 1106, a determination is made as to whether there exists any rack in the data center that has not been mapped.

If it is determined that a rack exists in the data center that has not been mapped, in operation 1111, streams of distinctive acoustic signals associated with the rack are generated. Next, in operation 1112, the streams of acoustic signals are captured. In one embodiment, the streams of acoustic signals are captured by the acoustic signal processor mounted on the ceiling of the data center. Of course, in a different embodiment, the stream of acoustic signals can be captured using any appropriate device capable of capturing streams of acoustic signals. Proceeding to operation 1114, the captured streams of acoustic signals are processed followed by operation 1116 in which the locale of the rack generating the streams of acoustic signals is determined. In operation 1118, the physical location of the rack is recorded in the data center sonic map. The method next proceeds to operation 1106 in which a determination is made as to whether there exists another rack that has not been mapped.

The aspects of the present invention are numerous. Most importantly, the localizing acoustic system of the present invention can ascertain the locale of an object in physical space using out-of-band communications. In this manner, a network failure cannot halt the process of locating the object in the physical space. Furthermore, the localizing acoustic system of the present invention can be used to create a spatial map of a plurality of computer systems in a data center even if the data center spans a wide geographical area. Still another aspect of the present invention is that problems affecting a plurality of computer systems defined within the same region can be identified and be eliminated. Yet another aspect is that the locality data can be sent to a database in formatted geographical coordinates (e.g., in ASCII format, etc.) to be transmitted to cell phones or PDAs of mobile administrators or service people. In this manner, the system failure can be reported to the system administrator out-of-band, without using the network. Lastly, the locality data can be implemented in conjunction with local systems (e.g., light beacons capable of guiding an on-site person to the rack containing the failed computer system, etc.).

With the above embodiments in mind, it must be noted that although specific reference is made to terminology defined by Sun Microsystems, Inc., it should be understood that any name could be used for such terms, so long as the desired functionality is achieved. Additionally, any reference to a particular standard should be viewed only as exemplary and focus should be placed on the claimed functional operation. Furthermore, it should be understood that the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, such quantities take the form of electrical or magnetic signals capable of being stored, transferred, combined, compared, and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for monitoring a data center, the method comprising:

transmitting an identifiable acoustic signal from a transmitter device defined on a source within a data center;

receiving the acoustic signal from the transmitter device defined on the source by at least two sensors;

processing the received acoustic signal using data from the at least two sensors to identify an approximate physical location of the source; and reporting the physical location of the source over a network.

2. A method as recited in claim 1, wherein each sensor of the at least two sensors is a microphone.

3. A method as recited in claim 1, wherein the operation of processing the received acoustic signal is an arrival-time correlation process, distributed sensor/time of flight process, or an echolocation process.

4. A method as recited in claim 1, wherein the approximate locale of the source is determined by an acoustic signal processor.

5. A method as recited in claim 1, wherein the physical location of the source is reported out-of-band.

6. A method as recited in claim 5, wherein the physical location of the source is reported using wireless technology.

7. A method for determining a physical location of a source, the method comprising:
   receiving an acoustic signal from a source placed within an acoustic monitoring area;
   processing a received acoustic signal, the processing using data from at least two sensors;
   identifying an approximate localized point in the acoustic monitoring area, the approximate localized point defining a physical location of the source; and
   reporting the physical location of the source over a network, wherein the source is a computer system or a rack including the computer system.

8. A method for determining a physical location of a source, the method comprising:
   receiving an acoustic signal from a source placed within an acoustic monitoring area;
   processing a received acoustic signal, the processing using data from at least two sensors;
   identifying an approximate localized point in the acoustic monitoring area, the approximate localized point defining a physical location of the source; and
   reporting the physical location of the source over a network, wherein the acoustic monitoring area is a data center.

9. A localizing system for determining a physical location of a source, the localizing system comprising:
   an acoustic environment configured to include the source, wherein the acoustic environment is a data center;
   a transmitter device for transmitting streams of identifiable acoustic signals, the transmitter device being defined on the source;
   at least a pair of compact sensors for detecting and capturing the streams of acoustic signals transmitted by the transmitter device; and
   a signal processor for receiving and processing captured streams of acoustic signals so as to ascertain the physical location of the source.

10. A localizing system as recited in claim 9, wherein the physical location of a rack is ascertained using an arrival-time correlation process.

11. A localizing system as recited in claim 9, the localizing system further comprising:
   a computer console for processing and displaying a location of the source in the acoustic environment.

12. A localizing system as recited in claim 9, wherein the pair of compact sensors is a pair of microphones.

13. A localizing system as recited in claim 9, wherein the data center includes a plurality of structures each including a system site, each system site including a plurality of racks, each rack including a plurality of computer systems.

14. A localizing system as recited in claim 13, wherein each system site includes a signal processor.

15. A localizing system as recited in claim 14, wherein each signal processor is defined on a central location in each system site.

16. A method for ascertaining a physical location of a failed computer system in a data center, the method comprising:
   receiving a failure report from the failed computer system;
   transmitting streams of acoustic signals;
   capturing transmitted streams of acoustic signals;
   processing the transmitted streams of acoustic signals so as to determine the physical location of the failed computer system; and
   reporting the physical location of the failed computer system.

17. A method as recited in claim 16, wherein the operation of receiving the failure report from the failed computer system includes,
   generating the failure report by the failed computer system; and
   communicating the failure report of the failed computer system.

18. A method as recited in claim 17, wherein the failure report is communicated out-of-band to a signaling circuitry.

19. A method as recited in claim 16, wherein the operation of transmitting streams of acoustic signals includes,
   defining an acoustic signal emitter on an outer surface of a rack including the failed computer system; and
   generating streams of acoustic signals having identifiable characteristics.

20. A method as recited in claim 16, wherein the operation of capturing the transmitted streams of acoustic signals includes,
   receiving streams of acoustic signals;
   identifying streams of acoustic signals having identifiable characteristics; and
   capturing transmitted streams of acoustic signals having identifiable characteristics.

21. A method as recited in claim 16, wherein the operation of processing transmitted streams of acoustic signals so as to determine the physical location of the failed computer system includes,
   sending transmitted streams of acoustic signals to a signal processor;
   converting the transmitted streams of acoustic signals; and
   executing converted streams of acoustic signals by a computer software so as to determine the physical location of the failed computer system.

22. A method as recited in claim 21, wherein the physical location of the failed computer system is determined using an arrival-time correlation process.

23. A method for generating a sonic map of a data center, the method comprising:
   for each system site in the data center,
      defining an acoustic signal processor on a central location of the system site; and
      for each rack in the system site,
         placing an acoustic signal emitter on a rack; and
         for each computer system in the rack,
            generating an identifiable signal;
            communicating the identifiable signal to the rack;
            transmitting associated streams of acoustic signals;
            capturing transmitted streams of acoustic signals by the acoustic signal processor;
            processing transmitted streams of acoustic signals; and
            displaying a locality of the computer system generating the identifiable signals.

* * * * *